(12) United States Patent
Sanyal et al.

(10) Patent No.: US 11,748,611 B2
(45) Date of Patent: Sep. 5, 2023

(54) METHOD AND APPARATUS FOR REINFORCEMENT LEARNING TRAINING SESSIONS WITH CONSIDERATION OF RESOURCE COSTING AND RESOURCE UTILIZATION

(71) Applicants: Sumit Sanyal, Santa Cruz, CA (US); Anil Hebbar, Santa Cruz, CA (US); Abdul Puliyadan Kunnil Muneer, Bangalore (IN); Abhinav Kaushik, Bangalore (IN); Bharat Kumar Padi, Bangalore (IN); Jeroen Bédorf, Heerhugowaard (NL); Tijmen Tieleman, Diemen (NL)

(72) Inventors: Sumit Sanyal, Santa Cruz, CA (US); Anil Hebbar, Santa Cruz, CA (US); Abdul Puliyadan Kunnil Muneer, Bangalore (IN); Abhinav Kaushik, Bangalore (IN); Bharat Kumar Padi, Bangalore (IN); Jeroen Bédorf, Heerhugowaard (NL); Tijmen Tieleman, Diemen (NL)

( * ) Notice: Subject to any disclaimer, the term of this patent is extended or adjusted under 35 U.S.C. 154(b) by 1121 days.

(21) Appl. No.: 16/278,699

(22) Filed: Feb. 18, 2019

(65) Prior Publication Data
US 2020/0265302 A1  Aug. 20, 2020

(51) Int. Cl.
*G06N 3/08* (2023.01)
*G06N 5/022* (2023.01)
(Continued)

(52) U.S. Cl.
CPC ............. *G06N 3/08* (2013.01); *G06N 3/045* (2023.01); *G06N 5/022* (2013.01); *G06Q 10/06313* (2013.01); *G06Q 2220/18* (2013.01)

(58) Field of Classification Search
CPC ........ G06N 3/0454; G06N 3/08; G06N 5/022; G06Q 10/06313; G06Q 2220/18
(Continued)

(56) References Cited

U.S. PATENT DOCUMENTS

2019/0019082 A1\* 1/2019 Dasgupta ............. G06N 3/0454

OTHER PUBLICATIONS

Li et al., "Reinforcement Learning for Uplift Modeling", Feb. 2019, downloaded from https://arxiv.org/, pp. 1-22. (Year: 2019).\*
(Continued)

*Primary Examiner* — Ted T. Vo
(74) *Attorney, Agent, or Firm* — Patrick Reilly

(57) ABSTRACT

Reinforcement learning enables a framework of information technology assets that include software elements, computational hardware assets, and/or, bundled software and computational hardware systems and products. The performance of successive sessions of an inner loop reinforcement learning is directed and monitored by an outer loop reinforcement learning wherein the outer loop reinforcement learning is designed to reduce financial costs and computational asset requirements and/or optimize learning time in successive instantiations of inner loop reinforcement learning training sessions. The framework enables consideration of the license costs of domain specific simulators, the usage cost of hardware platforms, and the progress of a particular reinforcement learning training. The framework further enables reductions of these costs to orchestrate and train a neural network under budget constraints with respect to the available hardware and software licenses available at runtime. These improvements and optimizations may be performed by using heuristics and neural network algorithms.

22 Claims, 17 Drawing Sheets

(51) Int. Cl.
*G06Q 10/0631* (2023.01)
*G06N 3/045* (2023.01)

(58) Field of Classification Search
USPC .......................................................... 706/12
See application file for complete search history.

(56) References Cited

OTHER PUBLICATIONS

Villa et al., "Machine Learning Projection Methods for Macro-Finance Models", 2018, Duke University, pp. 1-38. (Year: 2018).*

\* cited by examiner

METHOD AND APPARATUS FOR REINFORCEMENT LEARNING TRAINING SESSIONS WITH CONSIDERATION OF RESOURCE COSTING AND RESOURCE UTILIZATION

FIELD OF THE INVENTION

The present invention relates to methods and systems for applying reinforcement learning in computational environments that incur variable operational costs in sequential learning cycles and require at least temporary dedication of informational technology resources.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In the prior art, neural networks capable of action-selection have been well characterized, as have those that demonstrate reinforcement learning. However, in the prior art, action-selection and reinforcement-learning algorithms have been applied without optimal consideration of foreseeable costs of asset application, computational asset burdens and computational duration.

What is needed is a reinforcement learning system and method that implements action-selection and/or neural network structures in view of estimations of software product license charges and hardware platform access costs.

SUMMARY AND OBJECTS OF THE INVENTION

Toward these objects and other objects that are made obvious to one of ordinary skill in the art in light of the present disclosure, the method of the present invention (hereinafter, "the invented method") and the present invention are directed to provide reinforcement learning systems that achieve desirable reductions of learning process monetary costs, faster training convergence, and cost-efficient solution accuracy levels.

In a first preferred embodiment of the invented method, reinforcement learning (hereinafter, "RL") is enabled by means of an RL framework wherein the performance of successive sessions of an inner loop reinforcement learning process is directed and monitored by an outer loop reinforcement learning process wherein the outer loop reinforcement learning is designed to manage and/or reduce financial costs and computational asset requirements and/or optimize learning time in successive instantiations of inner loop reinforcement learning training sessions.

In certain alternate preferred embodiments of the invented method, the invented system is trained using the following gradient estimator:

$$\nabla_\theta U(\theta) \approx \hat{g} = \frac{1}{m}\sum_{i=1}^{m} \nabla_\theta \log P(\tau^{(i)}; \theta) R(\tau^{(i)})$$

Where:
- θ is a neural network of the high level controller, i.e., an outer loop neural network NN2;
- P is a probability distribution of RL suite training cycles, parametrized by theta;
- R is a reward function of a reward calculator and is the total reward for the i-th training run of the RL Suite;
- $\hat{g}$ is a policy gradient estimator for the RL controller of the RL agent;
- U is a utility function that provides action values to be maximized; and
- $T^{(i)}$ is the i-th trajectory of experiences, e.g., RL suite state, RL suite reward and RL suite action;

wherein the RL suite reward is derived by the reward function R from the state values of the RL suite. More particularly, these state value inputs to the reward function R include the accuracy and hyperparameter values of the inner loop neural network NN1, settings of a third-party domain-specific simulator (hereinafter, "DS simulator"), third-party hardware usage, values of levels and ranges of fidelity, granularity and simulation time slices per domain-specific simulation step or a plurality of domain-specific simulation steps, and clock time budget consumed per domain-specific simulation step or a plurality of domain-specific simulation steps, a number of inner loop RL agents, and a number of instances of DS simulators.

The RL suite actions generated by the outer loop neural network NN2 as directed by the utility function U of the outer loop neural network NN2 and communicated to the RL suite include changes to the DS simulator settings, hyperparameters of the inner loop neural network NN1, inner loop execution parameters of the RL agent, and hardware cluster settings, and/or other suitable values of parameters known in the art. The DS simulator settings changes may include (a.) limitations of license fee costs per DS simulation step, (b.) values of levels and ranges of fidelity, granularity and simulation time slices per DS simulation step or a plurality of DS simulation steps, (c.) a clock time budget consumed per DS simulation step or a plurality of DS simulation steps, (d.) a number of inner loop RL agents, and (e.) a number of instances of DS simulators.

The RL suite state values received by the outer loop neural network NN2 from the RL suite may include and refer to the accuracy and hyperparameter values of the inner loop neural network NN1, settings of the third-party DS simulator, third-party hardware usage, values of levels and ranges of fidelity, granularity and simulation time slices per DS simulation step or a plurality of DS simulation steps, and clock time budget consumed per DS simulation step or a plurality of DS simulation steps, a number of inner loop RL agents, and a number of instances of DS simulators.

The RL framework includes, applies and/or accesses information technology assets that include software elements, third party domain specific simulators, computational hardware assets, and additionally, optionally or alternatively, bundled software and computational hardware systems and products.

The RL framework employs reinforcement learning training and deployment of the reinforcement learning training systems, whereby the invented method is applied to jointly optimize or improve the cost and the performance of a selected training process. The RL framework enables consideration of the license costs of domain specific and other simulators, the usage cost of hardware platforms, and the progress of a particular RL training. The RL framework further enables reductions of these costs in order to orchestrate and train an RL neural network under budgetary constraints with respect to the available hardware and applicable software licenses available at runtime. These improvements and optimizations may optionally, alternatively or additionally be performed by using a combination of heuristics and neural network algorithms which result in an improved training policy that leads to a reduction of the monetary costs incurred, a faster training convergence, and a higher accuracy of simulation results.

An RL suite includes a simulation environment encompassing a domain specific simulator, a deployment platform, an RL agent, an RL hardware manager, a suite state processor, an RL suite reward calculator, a suite action dispatcher, and a model. The simulation environment preferably abstracts the domain-specific simulator and tightly binds to the domain specific simulator settings. The simulation environment exposes one or more tunable parameters of the RL suite, including granularity of the simulation and cost of licenses. This exposure enables a uniform application programming interface to allow a user or architect of the RL framework to program the RL agent to, in communication with the suite state processor, perform multivariable joint improvement or optimization of simulations that includes performance, cost and hardware usage.

The model is a software-encoded characterization of a collection of behaviors and dynamics, and/or a physical or virtual environment, system, object, or entity with which the RL framework is tasked to interact; the RL framework directs the RL agent to develop strategies and algorithms that produce higher rewards through repeated interaction of the RL agent with the model within the context of the simulation environment. The RL agent provides actions to the simulation environment and the simulation environment provides state and reward values to the RL agent in view of observations of a domain specific simulator of the simulation environment interacting with a specific model.

The suite state processor receives information from the RL hardware manager, the RL agent and the simulation environment from which suite state values are derived. The suite processor communicates the suite state values to both the RL suite reward calculator and to an RL controller. The RL controller is external to the RL suite, and may be, comprise and/or instantiate an artificial intelligence-powered outer loop which is external to and interacts with the RL suite and controls a selected domain-specific RL training process performed by means of the RL framework.

The suite state processor may optionally, alternatively or additionally take into account the training performance, simulation license cost and computation budget. The suite state processor may further optionally, alternatively or additionally take into account one or more of the following factors: neural network model performance; neural network hyper parameters; simulator settings; number of simulator instances; number of RL agent instances; hardware utilization by the RL agent; hardware utilization by the simulator; dynamic pricing of the instances; elapsed training time; computation budget consumed; simulation license cost incurred. With some or all of the above-listed information, the suite state processor creates a tensor that represents the state of the RL suite.

The RL suite reward calculator derives suite reward values from the suite state values received from the suite state processor and provides the suite reward values to the RL controller. The RL controller determines suite action messages at least partially on the basis of suite state values received from the suite state processor and suite reward values received from the RL suite reward calculator. The suite action messages are provided to the suite action dispatcher and are applied within the simulation environment to direct the activity of both the RL agent and the RL hardware manager. It is understood that the suite action messages include instructions to be applied by the simulation environment and are derived by the RL controller to cause the RL framework to produce desirable reductions of learning process monetary costs, faster training convergence, and cost-efficient solution accuracy levels.

The suite action dispatcher takes the input from the RL controller and controls training, simulation and hardware deployment of the RL suite. More particularly, in training, the suite action dispatcher may optionally take into account the hyper parameters of the relevant neural network, a count of training workers and/or an RL agent to be used. In simulation, the suite action dispatcher may optionally take into account simulator fidelity, a count of simulator instances, and/or a curriculum selection for training. In hardware deployment, the suite action dispatcher may optionally take into account a count of instances used for RL training, a count of RL workers per instance, a count of instances used for a given simulation, and/or a count of simulation workers per instance.

The RL controller applies artificial intelligence to guide domain-specific RL training for faster convergence under financial budgetary and time constraints. The RL controller monitors progress of a domain-specific reinforcement training executed by the simulation environment over time and periodically changes the settings of the simulation environment to optimize a convergence of domain specific RL policy under the constraints of budget and time. Budgetary considerations optionally include the simulation costs, e.g., licensing costs, and hardware utilization cost, i.e., computational asset access fees.

The RL user interface enables a user to import or export one or more models to and from the RL suite, and provide commands and parametric values to an RL orchestrator. The RL user interface additionally enables user monitoring of the RL orchestrator, the RL controller, and/or the RL suite. The RL user interface preferably provides domain-specific model import and export, RL framework configuration, RL operations suite monitoring and data exchange.

This domain-specific model preferably can support TensorFlow checkpoints, PyTorch models, and/or ONNX format and optionally or additionally provides functionalities to export the trained weights in an industry-wide, prior art format. Before training, the domain-specific model can be initialized by importing pre-trained weights in industry-standard data formats as well.

The RL user interface preferably can provide one or more of the following setting values or settings information to the RL orchestrator: a financial budget for one or more simulation licenses; a financial budget for hardware usage; a time duration value allowed to train; a target accuracy to direct a halt in training; one or more hyperparameters for the network including neural network model; a range of values for one or more hyperparameters to tune; and/or a range of simulator fidelity options that the RL framework can apply or impose.

The monitoring functionality of the RL user interface may optionally, alternatively or additionally provide one or more dashboards for: estimating costs in terms of money and time at a present moment and at a completion time; an accuracy of a particular training process; a count of training workers along with their details, e.g., names and other identifiers like IP addresses and hostnames, and their statuses, e.g. Running/Completed/Waiting/Failed/Error; and/or a count of simulation workers along with their details, e.g., names and other identifiers like IP addresses and hostnames, and their status, e.g., Running/Completed/Waiting/Failed/Error.

The RL orchestrator preferably controls the execution flow for the both the RL controller and the RL suite based on one or more initial settings selected or provided by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference into the present US Nonprovisional Patent Application, including U.S. Pat. Pub. Ser. No. 20160205697A1, titled "Analytics-assisted, multi-agents, self-learning, self-managing, flexible and adaptive framework for intelligent SON" (inventors Yongxi Tan et al.) and published on Jul. 14, 2016; U.S. Pat. No. 10,190,991B2, titled "Method for adaptive sampling in examining an object and system thereof" (inventors Yotam SOFER et al.) and issued on Jan. 29, 2019; U.S. Pat. No. 10,187,252B2 titled, "Configuring heterogeneous computing environments using machine learning" (inventors Charles Calvin Byers et al.) issued on Jan. 2, 2019; US Pat. Pub. Ser. No. 20170262216A1 titled "Dynamic storage tiering based on predicted workloads" (inventors Aleksei Alexandrovich Polkovnikov et al.) and published on Sep. 14, 2017; U.S. Pat. No. 10,146,286B2 titled "Dynamically updating a power management policy of a processor" (inventors Victor W. Lee et al.) and issued on Dec. 4, 2018: U.S. Pat. No. 10,146,225B2 titled "Systems and methods for vehicle dimension prediction" (inventor Lawrence Ryan) and issued on Dec. 4, 2018; U.S. Pat. No. 10,120,004B1 titled "Power consumption analyzing server and power consumption analyzing method thereof" (inventor Chia-Wei Tsai et al.) and issued on Nov. 6, 2018; U.S. Pat. No. 10,105,841B1 titled "Apparatus and methods for programming and training of robotic devices" (inventor: Botond Szatmary) and issued on Oct. 23, 2018; U.S. Pat. No. 9,314,924B1 titled "Predictive robotic controller apparatus and methods" (inventor inventor Patryk Laurent) and issued on Apr. 19, 2016; and US Pat. Pub. Ser. No. 20090157419A1 titled "Contextual execution of automated workflows" (inventor Brent Bursey) and published on Jun. 18, 2009.

BRIEF DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein.

DETAILED DESCRIPTION

Figure 1:
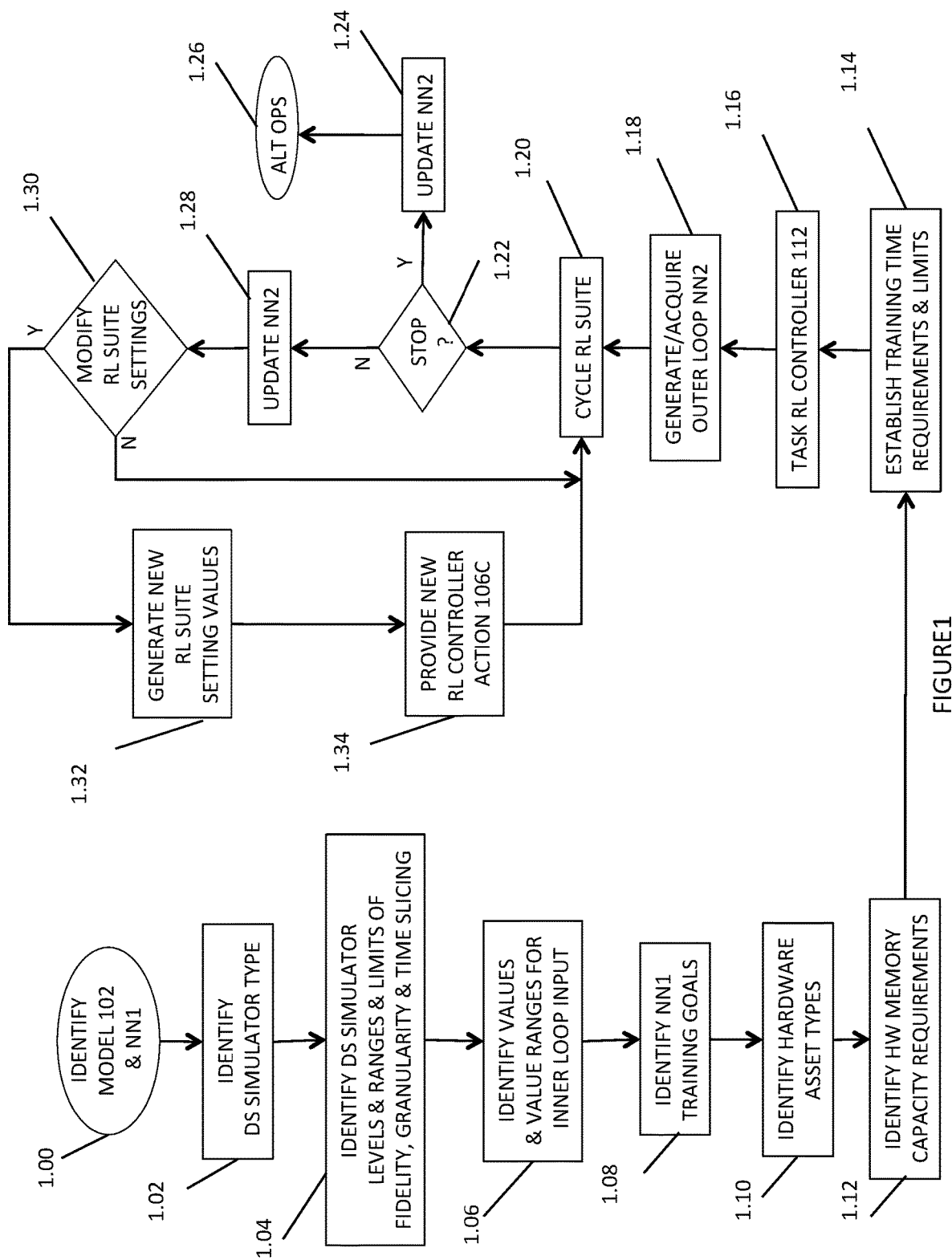
FIG. 1 is a representation of an information technology architectural design process that enables the generation of the first preferred embodiment of the present invention.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs.

Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

Figure 2:
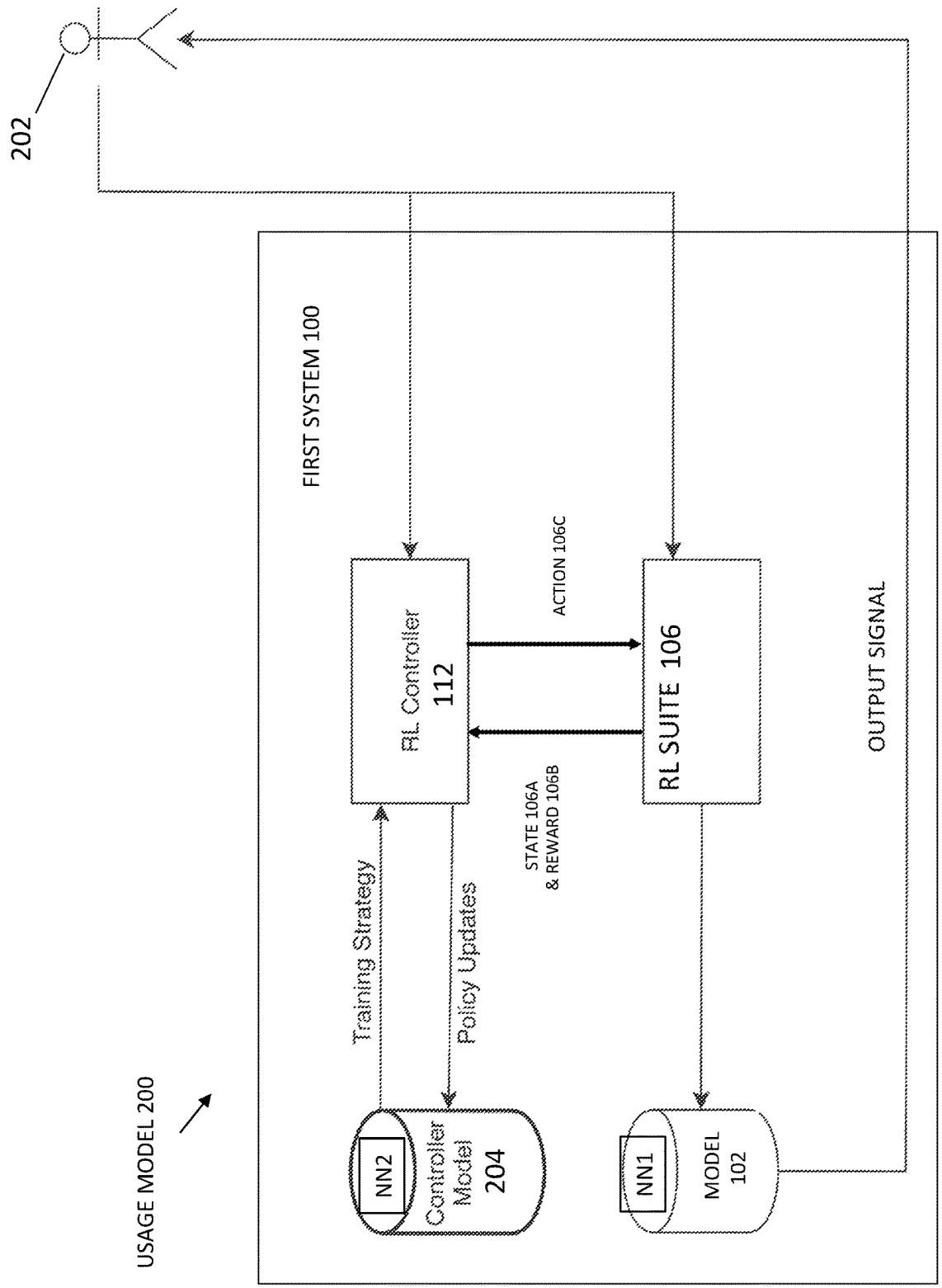
FIG. 2 is an exemplary usage model of a first preferred embodiment of the invented system.
Figure 3:
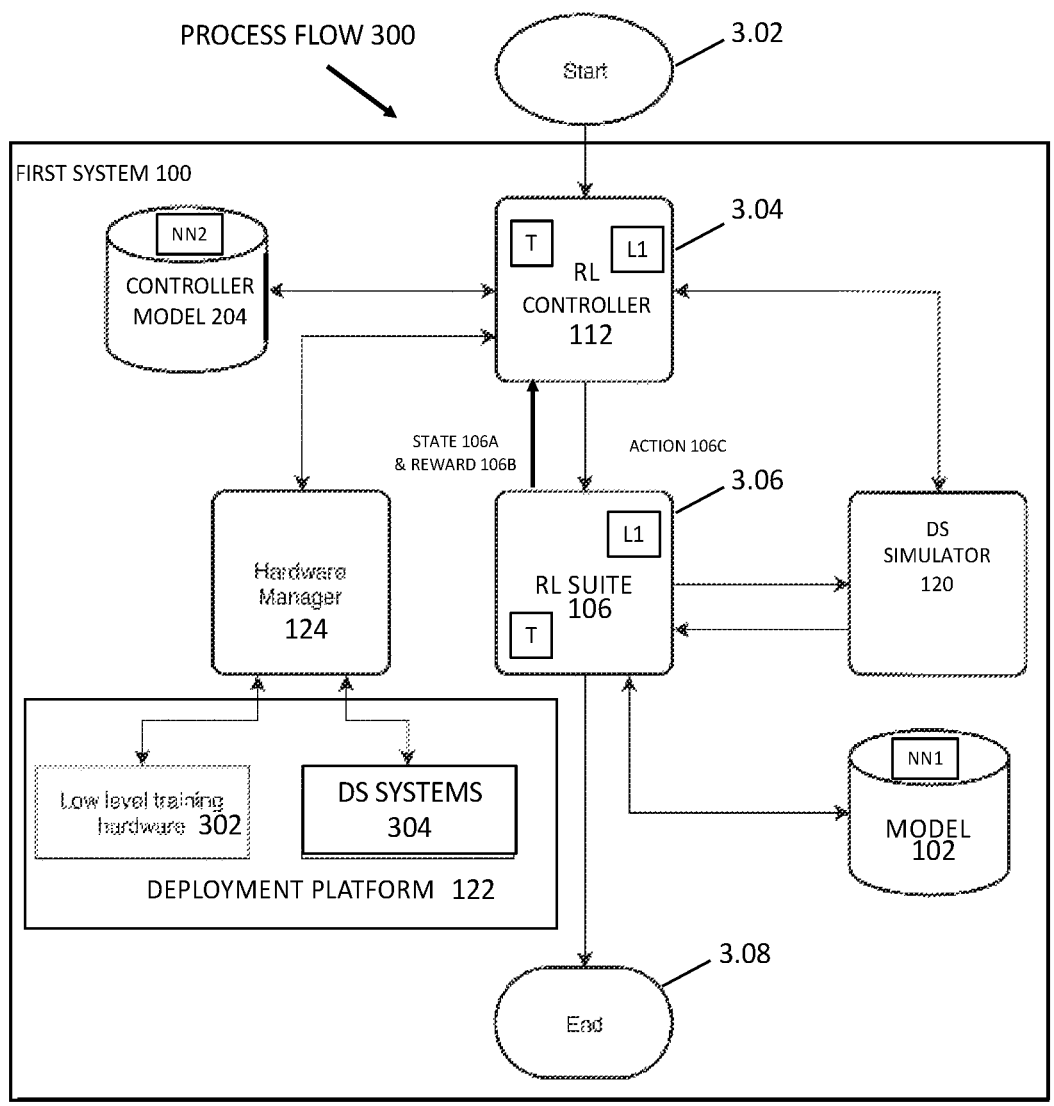
FIG. 3 is a partial block diagram of the first preferred embodiment of the invented system of FIG. 2 and indicating an exemplary process flow thereof.
Figure 4:
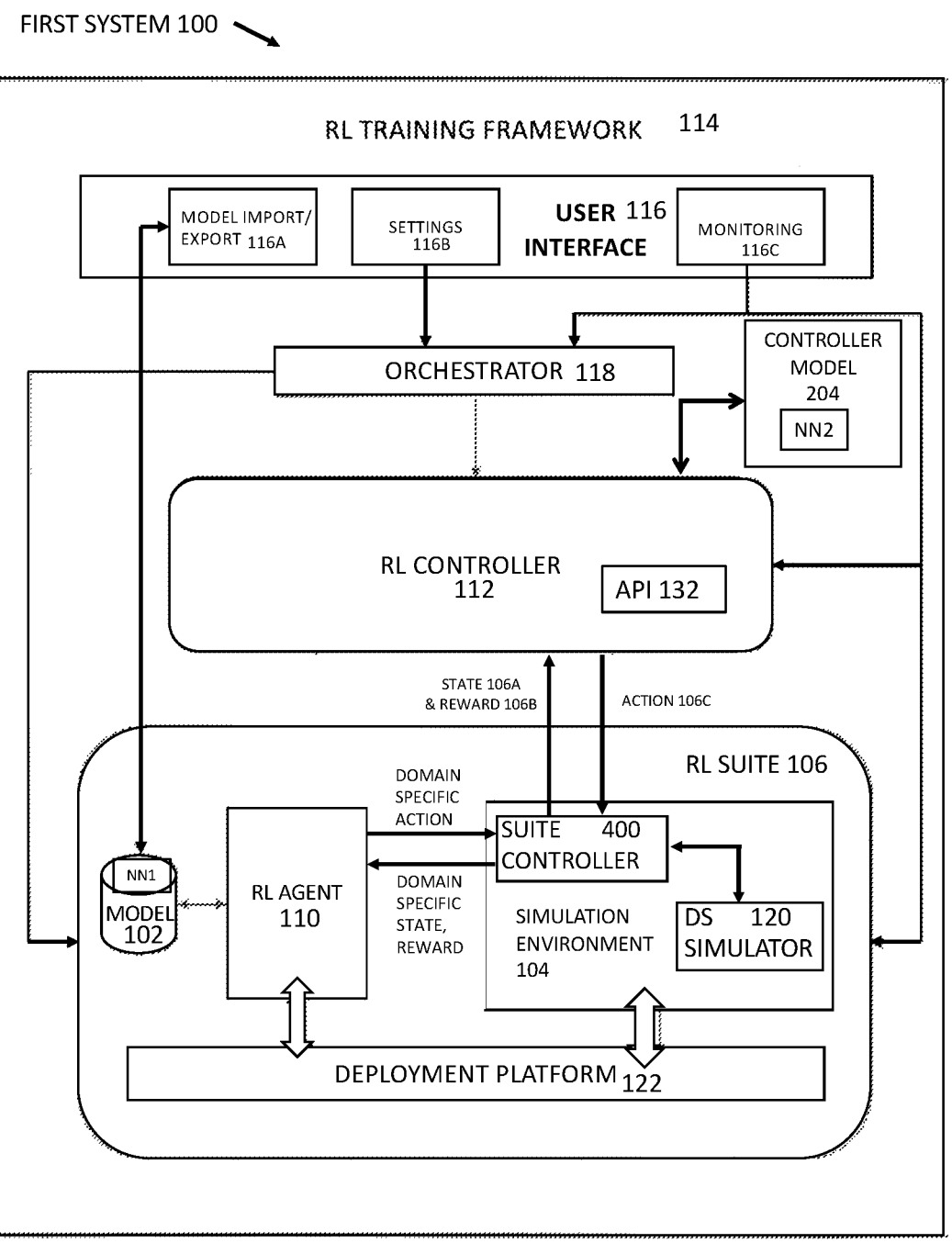
FIG. 4 is a block diagram of the RL framework as partially presented in FIG. 2 and FIG. 3.
Figure 5:
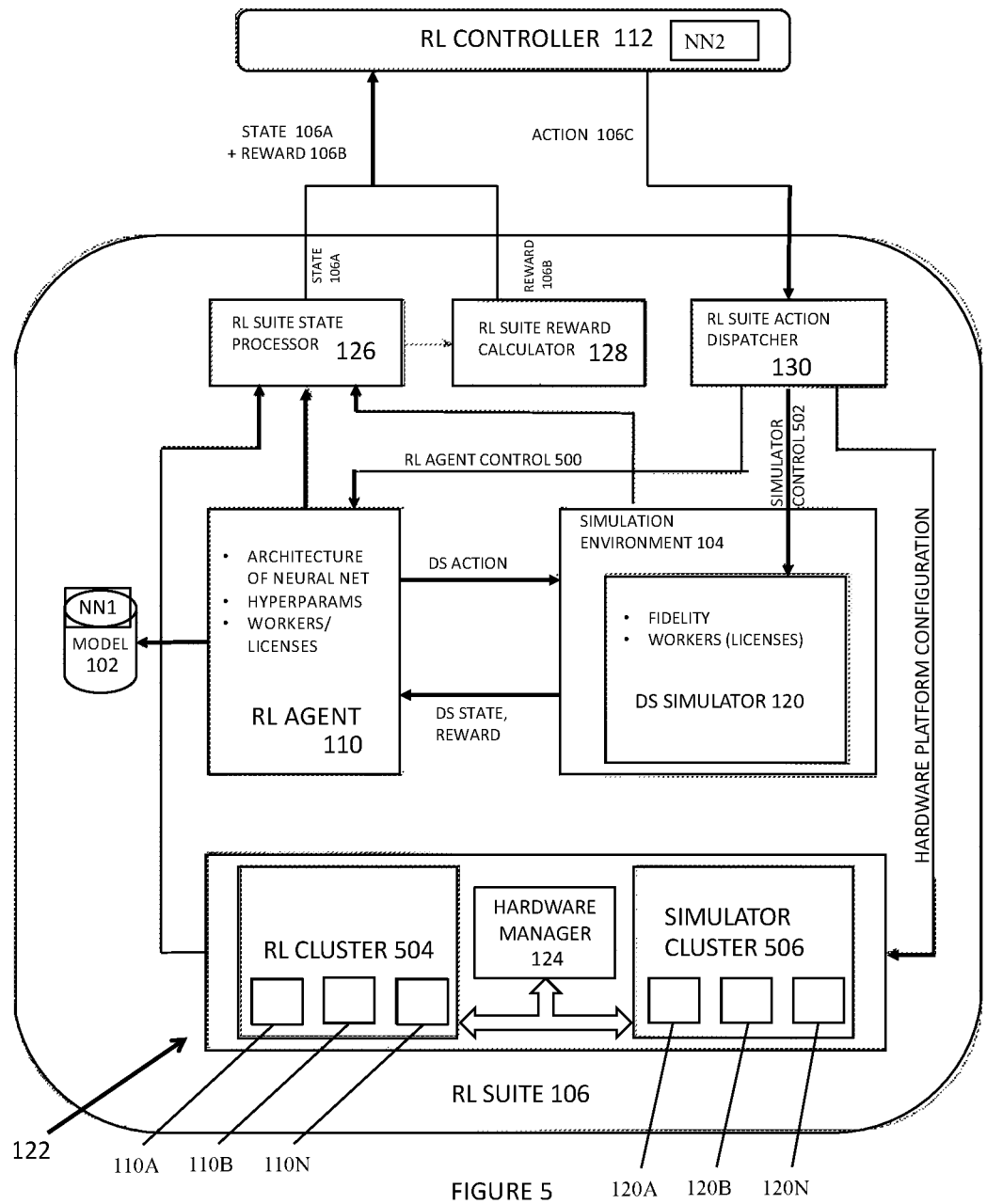
FIG. 5 is a detailed block diagram of an RL suite of software modules of FIG. 4 shown in relation to the RL controller of FIG. 4.

Referring now generally to the Figures and particularly to FIG. 1, FIG. 4, and FIG. 5, FIG. 1 is a first process chart that describes aspects of the invented method applicable to architect systems that (a.) enable the instantiation of various alternate preferred embodiments of the invented method and/or, (b.) embody various alternate preferred embodiments of the invented system such as, but not limited to a first preferred embodiment of the invented system 100 of FIGS. 2 through 11.

In a first step 1.00 of aspects of the invented method of FIG. 1, an architect identifies, determines, selects and/or receives a software-encoded model 102 including an inner loop neural network NN1 suitable to be exercised with a simulation environment 104 of FIGS. 4 and 5, and whereby a simulation of a dynamic behavior and/or state changes of a system of interest (not shown) is to be executed. For example, the software-encoded model 102 (hereinafter, "the first model" 102) might be a software-encoded representation of the expected behavior due to external stresses and inherent design qualities of a suspension element (not shown) of an automobile chassis assembly, and the inner loop neural network NN1 is selected for training in step 1.20, i.e., an inner loop reinforcement learning process step.

In step 1.04 the architect identifies or selects a type of domain-specific simulator type to be accessed in the inner loop reinforcement learning process of step 1.20.

In step 1.06 the architect identifies, determines, selects and/or receives what variables and ranges of input values, to include nominal operational time durations, might be input into the first model 102 and/or the inner loop neural network NN1 in the course of a simulation session. It is understood that preferably the RL suite 106 is architected to allow multiple instances of an RL agent 110, whereby the RL suite 106 enables multiple instances of RL agent 110A-110N and model 102 pairs that are preferably each exercised in succeeding cycles of the inner loop reinforcement learning steps. It is understood that each instance of the first model 102 comprises unique and distinguishable software-encoded characterizations of unique and distinguishable collection of behaviors and dynamics, and/or one or more unique and distinguishable physical or virtual environment, system, object, or entity. In step 1.08 the architect identifies one or more training goals of the inner loop neural network NN1.

In step 1.10 the architect selects one or more types of computational systems, i.e., hardware, and quantities thereof, sufficient to be effectively tasked to successfully perform a planned simulation process. In step 1.12 the architect identifies, determines, selects and/or receives values for the memory capacity of one or more computational systems and/or one or more networks of computational systems selected in step 1.08 sufficient to be effectively tasked to successfully perform a planned reinforcement learning process session.

In step 1.14 the architect specifies a training duration time limit to be imposed upon one or a plurality of inner loop training cycles or sessions. And in step 1.1 the architect identifies, determines, selects and/or receives values of levels and ranges of simulation fidelity, simulation granularity and simulation time slices to be applied by the first system 100 in performing the planned reinforcement learning process session.

In step 1.16 the architect receives, generates and/or selects and tasks an RL controller 112 that is designed to receive from the RL suite 106 the RL suite state information 106A and the RL suite reward 106B, and thereupon generate and provide to the RL suite 106 RL controller actions 106C.

The architect provides to the RL controller 112 in step 1.18 with an outer loop neural network NN2 that is trained in the performance of outer loop reinforcement learning. The outer loop neural network NN2 integrates and comprises one or more algorithms, costing values, hardware usage costing values, financial expenditure limits, and/or incremental licensed software access fees for use by the RL controller 112 in (a.) accepting the RL suite state information 106A and RL suite reward 106B; and (b.) generating and providing RL controller actions 106C to the RL suite 106.

In step 1.20 an inner loop reinforcement learning step is performed and in step 1.22 the first system 100 determines whether to halt a current the inner loop reinforcement learning process. The first system 100 might determine to halt the current the inner loop reinforcement learning process if (a.) a time duration value T as provided to the RL suite 106 by the outer loop neural network NN2 has been met or exceeded; (b.) a financial budgetary limit L1 provided to the RL suite 106 by the outer loop neural network NN2 has been met or exceeded; and/or (c.) another suitable operational limitation to reinforcement learning known in the art or disclosed in the present disclosure provided to the RL suite 106 by the outer loop neural network NN2 has been met or exceeded.

When the first system 100 determines in step 1.22 to halt the current the inner loop reinforcement learning process, the outer loop neural network NN2 is updated with this finding, the RL suite state information 106A, RL suite reward 106B and optionally additional information in step 1.24. The first system 100 proceeds from step 1.24 to step 1.26 and to perform alternate computational operations in step 1.28.

In the alternative, when the first system 100 determines in step 1.22 to continue the current the inner loop reinforcement learning process, the outer loop neural network NN2 is updated with this finding, the RL suite state information 106A, the RL suite reward 106B and optionally additional information in step 1.28. In step 1.30 the outer loop neural network NN2 optionally determines whether to generate new RL suite 106 settings modification information. When the outer loop neural network NN2 determines in step 1.30 to generate new RL suite 106 settings modification information, the outer loop neural network NN2 generates new RL suite 106 setting modification information in step 1.32. The RL controller 112 in step 1.34 transfers the setting modification information generated in step 1.32 to the RL suite 106 as an RL controller action 106C.

The first system 100 proceeds from step 1.34 to another execution of step 1.20

It is understood that the meaning of the term architect encompasses one or more entities, to include one or more human programmers, project managers, and/or artificial intelligence systems.

Referring now generally to the Figures and particularly to FIG. 2, FIG. 2 is an exemplary usage model 200 driven by a user 20 of the first system 100 applying reinforcement learning via an outer loop to the RL controller 112. The user 202 directs the RL controller 112 to accept training strategies from a controller model 204 and to apply these training strategies to the RL suite 106 as outer loop actions. The RL controller 112 accepts resultant outer loop state and rewards from the RL suite 106 and derives policy updates from these received outer loop state and rewards and provides the policy updates to the controller model 204. The first system 100 thereby evolves the controller model 204 to apply reinforcement learning to improve the performance of the RL controller 112.

Referring now generally to the Figures and particularly to FIG. 3, FIG. 3 is a partial block diagram of the first system 100 and indicating an exemplary process flow 300. In step 3.02 of the exemplary process flow 300 the first system 100 is powered up and the RL controller 112 engages with the controller model 204; the controller model 204 is a serialized storage of the outer loop neural network NN2, which the RL agent 110 updates on the basis of outer loop rewards and outer loop status received from the RL suite 106. The RL controller 112 applies reinforcement learning by engagement of the outer loop information state and reward information as provided to the RL controller 112 by the RL suite 106, the hardware manager 124 and the DS simulator 120. It is understood that the hardware manager 124 is in bi-directional communications with a plurality of low-level training hardware systems 302 and domain-specific computational systems 304. Each low-level training hardware system 302 is paired with one domain-specific computational system 304 in one-to-one correspondences, and each domain-specific computational system 304 includes or has access to a DS simulator 120. The hardware manager 124 facilitates bi-directionally communication between the paired low-level training hardware systems 302 and one domain-specific computational system 304, and enables the deployment platform to provide computational results from the paired resources 302 & 304 to the RL suite state processor 126.

In step 3.06 the RL suite 106 engages with the DS simulator 120 and the first model 102 in reinforcement learning of the inner loop of the first system 100. The exemplary process flow 300 terminates in step 3.08.

Referring now generally to the Figures and particularly to FIG. 4 and FIG. 5, FIG. 4 is a diagram of the first system 100 and FIG. 5 is a detailed block diagram comprising the RL controller 112 and the RL suite 106. The first system 100 includes an RL framework 114 of information technology assets (hereinafter, "the RL framework" 114) that accepts and engages with the software-encoded model 102. The RL framework 114 includes software elements, computational hardware assets, and additionally, optionally or alternatively, bundled software and computational hardware systems and products. More particularly, the RL framework includes an RL user interface 116, an RL orchestrator 118, the RL controller 112, and the RL suite 106.

The RL framework 114 employs reinforcement learning training and deployment of the reinforcement learning training systems, whereby the invented method is applied to jointly improve or optimize for the cost and the performance of a selected training. The RL framework 114 enables consideration of the license costs of a domain specific simulator 120 and other third-party, commercially available or custom-coded simulators, the usage cost for the hardware platforms, and the progress of a particular RL training. The RL framework 114 further enables reductions of these costs in order to orchestrate and train the RL inner loop neural network NN1 under budget constraints with respect to the available hardware and applicable software licenses available at runtime. These improvements and optimizations may optionally, alternatively, or additionally be performed by using a combination of heuristics and neural network algorithms which result in an improved training policy that leads to a reduction of the monetary costs incurred, a faster training convergence, and a higher accuracy of simulation results.

An RL suite 106 includes a simulation environment 104 encompassing the domain specific simulator 120 (hereinafter, "the DS simulator" 120), a deployment platform 122, the RL agent 110, an RL hardware manager 124, a suite state processor 126, an RL suite reward calculator 128, a suite action dispatcher 130, and the first model 102. The simulation environment 104 preferably abstracts the DS simulator 120 and tightly binds to the settings of the DS simulator 120. The simulation environment 104 exposes one or more tunable parameters of the RL suite 106, including a granularity quality of the DS simulator 120 and cost of licenses. The DS simulator 120 may be a third-party software service or product. Additionally and alternatively, the DS simulator 120 preferably enables varying of simulation granularity settings as directed by setting modifications specified in one or more RL control actions 106C.

The domain specific, inner loop of the first system 100 is instantiated by the bi-directional communicative engagement of the DS simulator 120 with the RL agent 110 A suite controller 400 receives both (a.) domain specific, inner loop actions transferred from the RL agent 110; and (b.) outer loop actions received from the RL controller 112. Correspondingly, the suite controller 400 calculates and provides both (a.) domain specific, inner loop status and reward values to the RL agent 110; and (b.) outer loop status and reward values to the RL controller 112. It is understood that the suite controller 400 accesses the DS simulator 120 in the generation of the both (a.) the outer loop status and reward values, and (b.) the outer loop status and reward values.

Referring now generally to the Figures and particularly to FIG. 4 and FIG. 5, FIG. 5 is a detailed block diagram of the RL suite 106 presented in relation to the RL controller 112 and a detailed block diagram of the RL suite 106 presented in relation to the RL controller 112.

A bi-directional communicative coupling of the simulation environment 104 and the RL agent 110 enables the simulation environment 104 to derive, and provide to the RL agent 110, domain-specific state values and domain -specific reward values from outputs of the DS simulator 120. The bi-directional communicative coupling of the simulation environment 104 and the RL agent 110 further enables the RL agen 110 to derive, and provide to the simulation environment 104, domain-specific actions in view of the outputs of the first model 102.

The bi-directional communicative coupling of the simulation environment 104 and the RL agent 110 additionally enables a uniform RL agent applications programming interface 132 of the RL controller 112 to be applied to program the RL agent 110 to, in combination with the suite state processor 126, perform multivariable joint improvement or optimization that includes performance, cost and hardware usage.

The first model 102 is a software-encoded domain-specific characterization of a plurality of behaviors and dynamics, and/or a physical or virtual environment, system, object, or entity, with which the RL framework 114 is tasked to interact; the RL framework 114 directs the RL agent 110 to develop strategies and algorithms that produce higher rewards through repeated interaction of the RL agent 110 with the first model 102 within the context of the simulation environment 104. The RL agent 110 provides actions to the simulation environment 104 and the simulation environment 104 provides state and reward values to the RL agent 110 in view of observations of the DS simulator 120 of the simulation environment 104 interacting with a specific software-encoded model, e.g., the first model 102.

The suite state processor 126 receives information from the RL hardware manager, the RL agent 110 and the simulation environment 104, from which suite state values are derived. The suite processor communicates the suite state values to both the RL suite reward calculator 128 and the RL controller 112. The RL controller 112 is external to the RL suite 106, and may be, comprise and/or instantiate an artificial-intelligence powered outer loop, which is external to and interacts with the RL suite 106 and controls a selected domain-specific RL training process performed by means of the RL framework 114. The RL controller 112 receives the RL suite state information and the RL suite reward 106B from the RL suite reward calculator 128 and the RL controller 112 provides RL controller actions 106C to the RL suite 106, wherein the RL controller actions 106C are received by the RL suite action dispatcher 130. The RL suite action dispatcher 130 separates the contents of each RL controller actions 106C into an RL agent control information 500 and a simulator control information 502. Each RL agent control information 500 is transferred to the RL agent 110, and each simulator control information 502 is transferred to the simulation environment 104.

The suite state processor 126 may optionally, alternatively or additionally take into account the training performance, simulation license cost and computation budget. The suite state processor 126 may further optionally, alternatively, or additionally take into account one or more of the following factors: neural network model performance; neural network hyper parameters; settings of the DS simulator 120; number of instances of the DS simulator 120; number of instances of the RL agent 110 instances; hardware utilization by the RL agent 110; hardware utilization by the DS simulator 120; dynamic pricing of the instances of the DS simulator 120; elapsed training time; computation budget consumed; license cost of the DS simulator 120 incurred. With some or all of the above-listed information, the suite state processor 126 creates a tensor that represents the state of the RL suite 106.

The RL suite reward calculator 128 derives suite reward values from the suite state values received from the suite state processor 126 and provides the suite reward values to the RL controller. The RL controller 112 determines suite action messages at least partially on the basis of suite state values received from the suite state processor 126 and suite reward values received from the RL suite reward calculator 128; the suite action messages are provided to the suite action dispatcher 130 and applied within the simulation environment 104 to direct the activity of both the RL agent 110 and the RL hardware manager. It is understood that the suite action messages include instructions to be applied by the simulation environment 104 and are derived by the RL controller 112 to cause the RL framework 114 to produce desirable reductions of learning process monetary costs, faster training convergences, and cost-efficient solution accuracy levels.

The suite action dispatcher 130 takes the input from the RL controller 112 and controls training, simulation and hardware deployment of the RL suite 106. More particularly, in training the suite action dispatcher 130 may optionally take into account the hyperparameters of the relevant inner loop neural network NN1, a count of training workers and/or an RL agent 110 to be used in a reinforcement learning training cycle. In simulation, the suite action dispatcher 130 may optionally take into consideration simulator fidelity, a count of simulator instances, and/or a curriculum selection for training. In hardware deployment, the suite action dispatcher 130 may optionally take into account a count of instances used for RL training, a count of RL workers per instance, a count of instances used for a given simulation, and/or a count of simulation workers per instance.

The RL controller 112 applies artificial intelligence to guide domain-specific RL training for faster convergence under financial budget and time constraints. The RL controller 112 monitors progress of a domain-specific reinforcement training executed by the simulation environment 104 over time and periodically changes the settings of the simulation environment 104 to optimize a convergence of domain specific RL policy under the constraints of budget and time. Budgetary considerations optionally include the simulation costs, e.g., licensing costs, and hardware utilization cost, i.e., computational asset access fees.

The RL user interface 116 preferably provides domain specific model 102 import and export, RL framework 114 configuration, operations RL suite 106 monitoring and data exchange. A model import/export module 116A of the RL user interface 116 enables a user to import one or more models 102 into the RL suite 106 and alternatively export one or more models 102 from the RL suite 106. A settings module 116B of the RL user interface 116 provides commands and parametric values to the RL orchestrator 118. A monitor module 116C of the RL user interface 116 additionally enables user monitoring of the RL orchestrator 118, the RL controller 112 and/or the RL suite 106.

The domain specific model 102 preferably can support TensorFlow checkpoints, PyTorch models, and/or the ONNX format and optionally or additionally provides functionalities to export the trained weights in an industry-wide, prior art format. Before training, the domain specific model 102 can be initialized by importing pre-trained weights in supported formats as well.

The RL user interface 116 preferably can provide one or more of the following setting values or settings information to the RL orchestrator 118: a financial budget for one or a plurality of simulation product licenses; a financial budget for hardware usage; a time duration value allowed to train; a target accuracy to direct a halt in training; one or more hyperparameters for a simulation network (not shown) including the inner loop neural network NN1; a range of values for one or more hyperparameters to tune; and/or a range of simulator fidelity that the RL framework 114 can apply or impose.

The monitoring functionality of the RL user interface 116 may optionally, alternatively or additionally provide one or more dashboards for: estimating costs in terms of money and time at a present moment and at a completion time; an accuracy of a particular training process; a count of training workers along with their details, e.g., names and other identifiers like IP addresses and hostnames, and their statuses, e.g. Running/Completed/Waiting/Failed/Error; and/or a count of simulation workers along with their details, e.g., names and other identifiers like IP addresses and hostnames, and their statuses, e.g., Running/Completed/Waiting/Failed/Error.

The RL orchestrator 118 preferably controls the execution flow for both the RL controller 112 and the RL suite 106 based on one or more initial settings selected or provided by the user.

The deployment platform 122 includes a plurality of RL agents 110A-110N and a plurality of DS simulators 120A-120N. Each RL agent 110A-110N is both paired with and bi-directionally communicatively coupled with one domain-specific DS simulator 120. It is understood that each RL agent 110A-110N may be hosted on one low-level training hardware system 302 and domain-specific DS simulator 120 may be hosted on one domain-specific computational systems 306.

Figure 14:
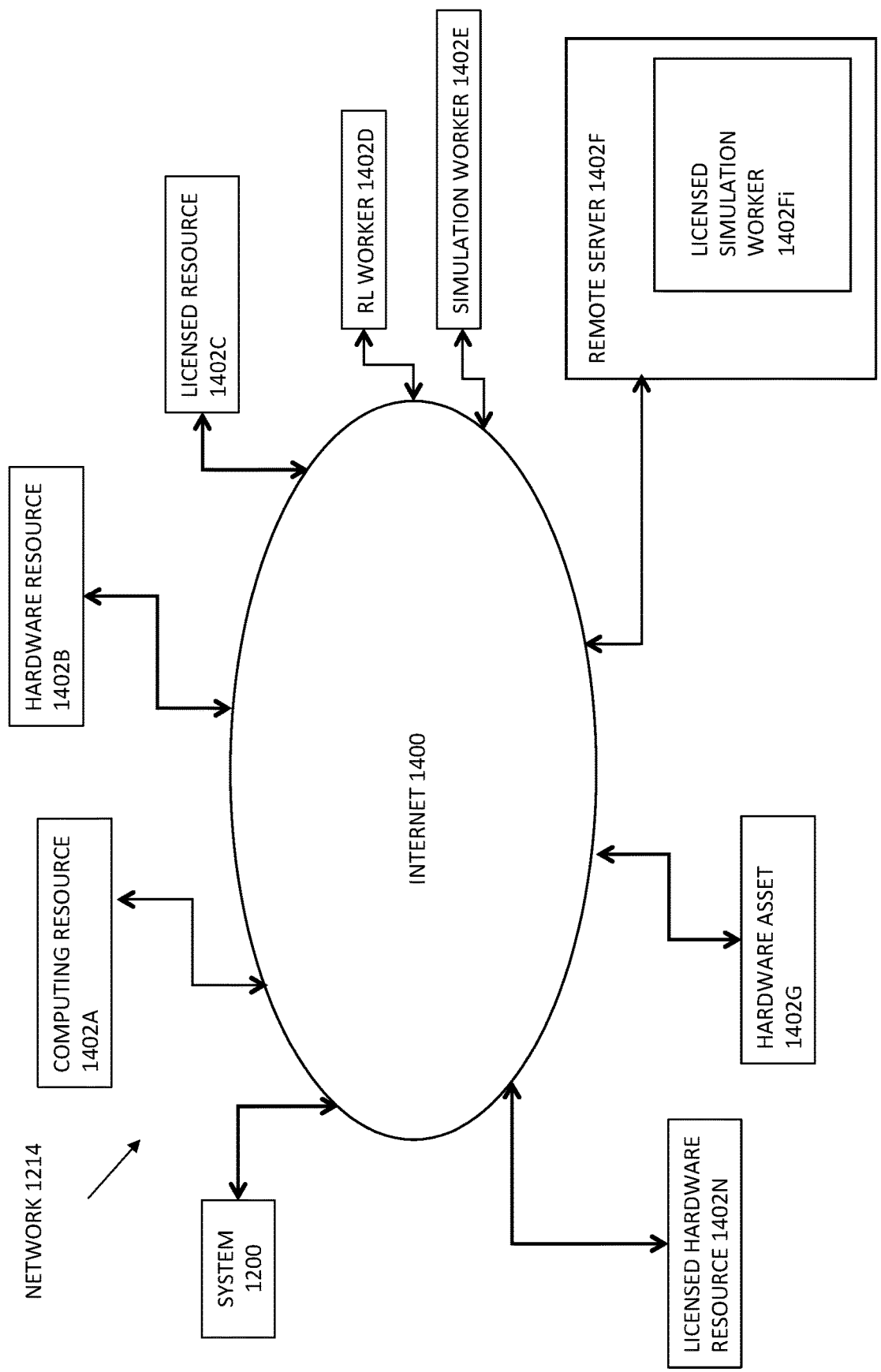
FIG. 14 is a block diagram of the electronics communications network of FIG. 12.
Figure 15:
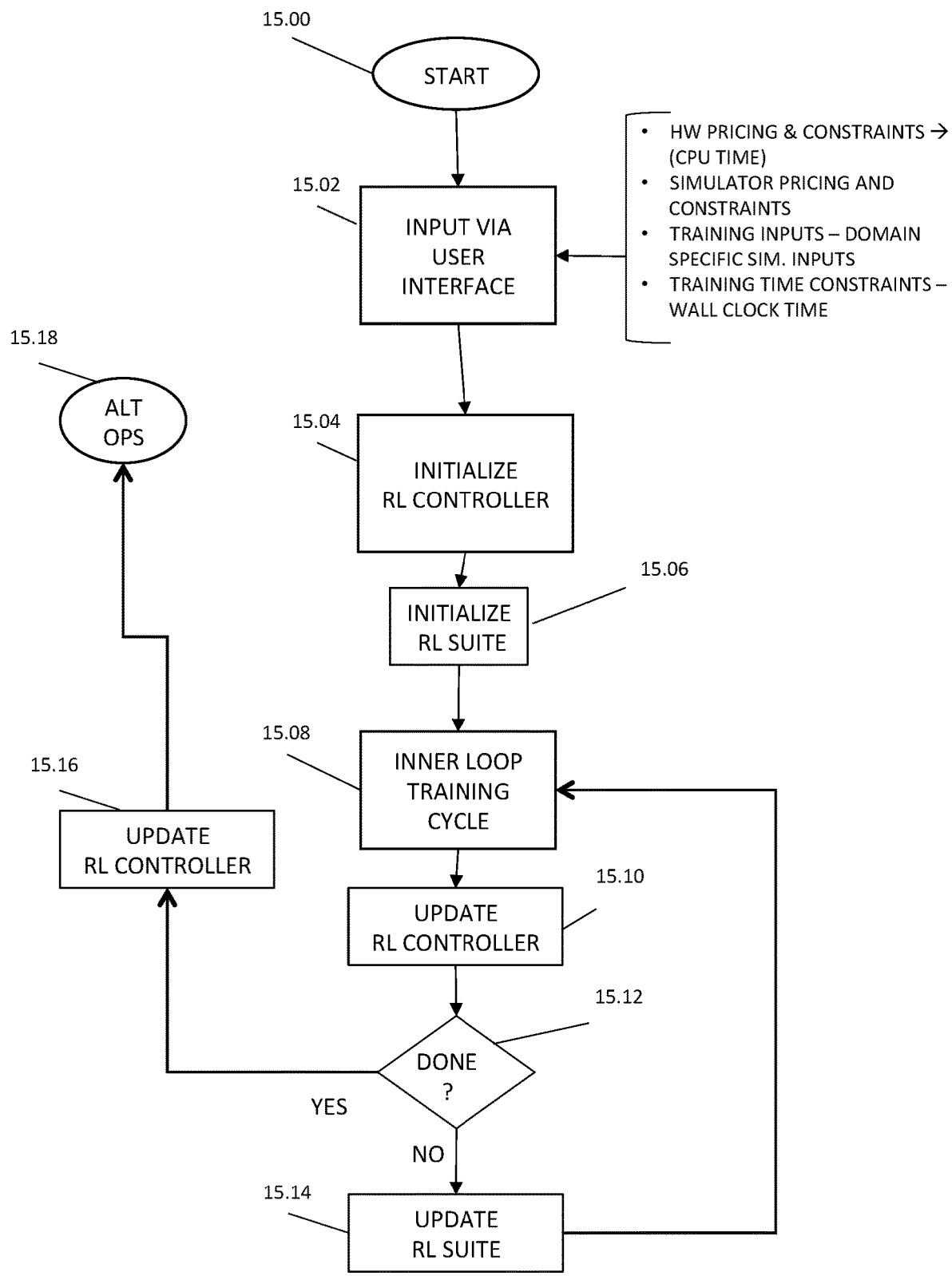
FIG. 15 is a software flowchart of an exemplary application of the invented method by means of the information technology system and the electronics communications network of FIG. 12.

Referring now generally to the Figures and particularly to FIGS. 4, 5 and 14, in certain alternate preferred embodiments of the invented method, the invented system 100 is trained using the following gradient estimator:

$$\nabla_\theta U(\theta) \approx \hat{g} = \frac{1}{m}\sum_{i=1}^{m} \nabla_\theta \log P(\tau^{(i)}; \theta) R(\tau^{(i)})$$

Where:
θ is the outer loop neural network NN2;
P is a probability distribution of training cycles of the RL suite 106, parametrized by theta;
R is a reward function of the RL suite reward calculator 128 and is the total reward for the i-th training run of the RL Suite 106;
ĝ is a policy gradient estimator of the RL controller 112 for the RL agent 106;
U is a utility function that provides RL controller actions 106C to be maximized; and
$\tau^{(i)}$ is the i-th trajectory of experiences, e.g., the RL suite state information 106A, the RL
R is a reward function of the RL suite reward calculator 128 and is the total reward for the suite reward 106B, and the RL controller action 106C;
wherein the RL suite reward 106B is derived by the reward function R from the state values of the RL suite 106. More particularly, these state value inputs to the reward function R include the accuracy and hyperparameter values of the inner loop neural network NN1, settings of the third-party DS simulator 120, usage limits of third-party hardware 1402A-1402N of FIG. 14, values of levels and ranges of fidelity, granularity and simulation time slices per an individual simulation step of one or a plurality of DS simulators 120, and clock time budget consumed per an individual simulation step or a plurality of simulation steps of one or a plurality of DS simulators 120, a number of inner loop RL agents, and a number of instances of DS simulators 120.

The outer loop actions generated by the outer loop neural network NN2 as directed by the utility function U of the outer loop neural network NN2 and communicated to the RL suite may include changes to settings of one or more DS simulators, hyperparameters of the inner loop neural network NN1, inner loop execution parameters of one or more instances of the RL agent 110 & 110A-110N, settings of the hardware cluster 504, and/or other suitable values of parameters known in the art. The settings changes of instances of DS simulators 120 may include (a.) limitations to license fee costs per simulation step of one or more DS simulators 120, (b.) values of levels and ranges of fidelity, granularity and simulation time slices per simulation step or a plurality of simulation steps of one or more DS simulators 120, (c.) a clock time budget consumed per one or more simulation steps of one or more DS simulators 120 & 120A-120N, (d.) a number of inner loop RL agents 110 & 110A-110N, and (e.) a number of instances of DS simulators.

The values provided in RL suite state information 106A received by the outer loop neural network NN2 from the RL suite 106 may include and refer to the accuracy and hyperparameter values of the inner loop neural network NN1; a count of instances of DS simulators 120 120A & 120N exercised in an inner loop reinforcement activity; settings of one or more instances of DS simulators 120 & 120A-120N; usage values of one or more third-party hardware 1402A-1402N; values of levels and ranges of fidelity, granularity and simulation time slices of one or more steps of simulation steps performed by one or more instances of DS simulators 120 & 120A-120N; and a clock time consumed in inner loop activity, such as but not limited to, consumed by one or more instances of the DS simulators 120 & 120A-120N and/or a count of RL agents 110 & 110A-110N.

Figure 6:
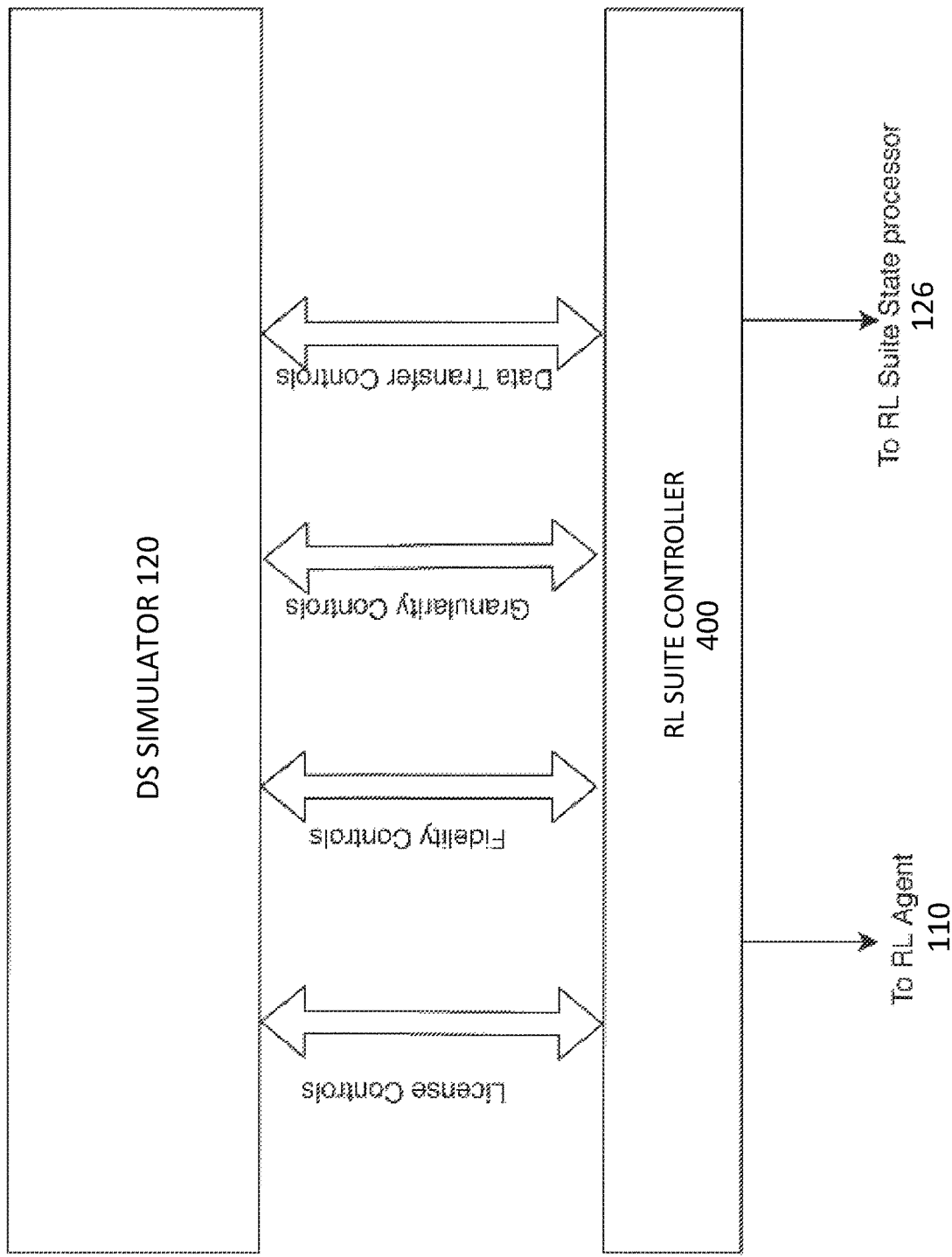
FIG. 6 is a block diagram further detailing the information exchange between the domain specific simulator and RL suite controller of FIGS. 3, 4, and 5.

Referring now generally to the Figures and particularly to FIG. 6, FIG. 6 is a block diagram showing in further detail the communication between the DS simulator 120 and the suite controller 400. The suite controller 400 further communicates signals to the RL agent 110 and the RL suite state processor 126, as shown. The suite controller 400 and the DS simulator 120 send signals bi-directionally back and forth, such as but not limited to, component information of the RL suite state information 106A, RL suite reward 106 B, and RL controller actions 106C, confirming information or repudiations, including (but not limited to) license control authorizations, fidelity controls, granularity control confirmations, and data transfer control requests.

Figure 7:
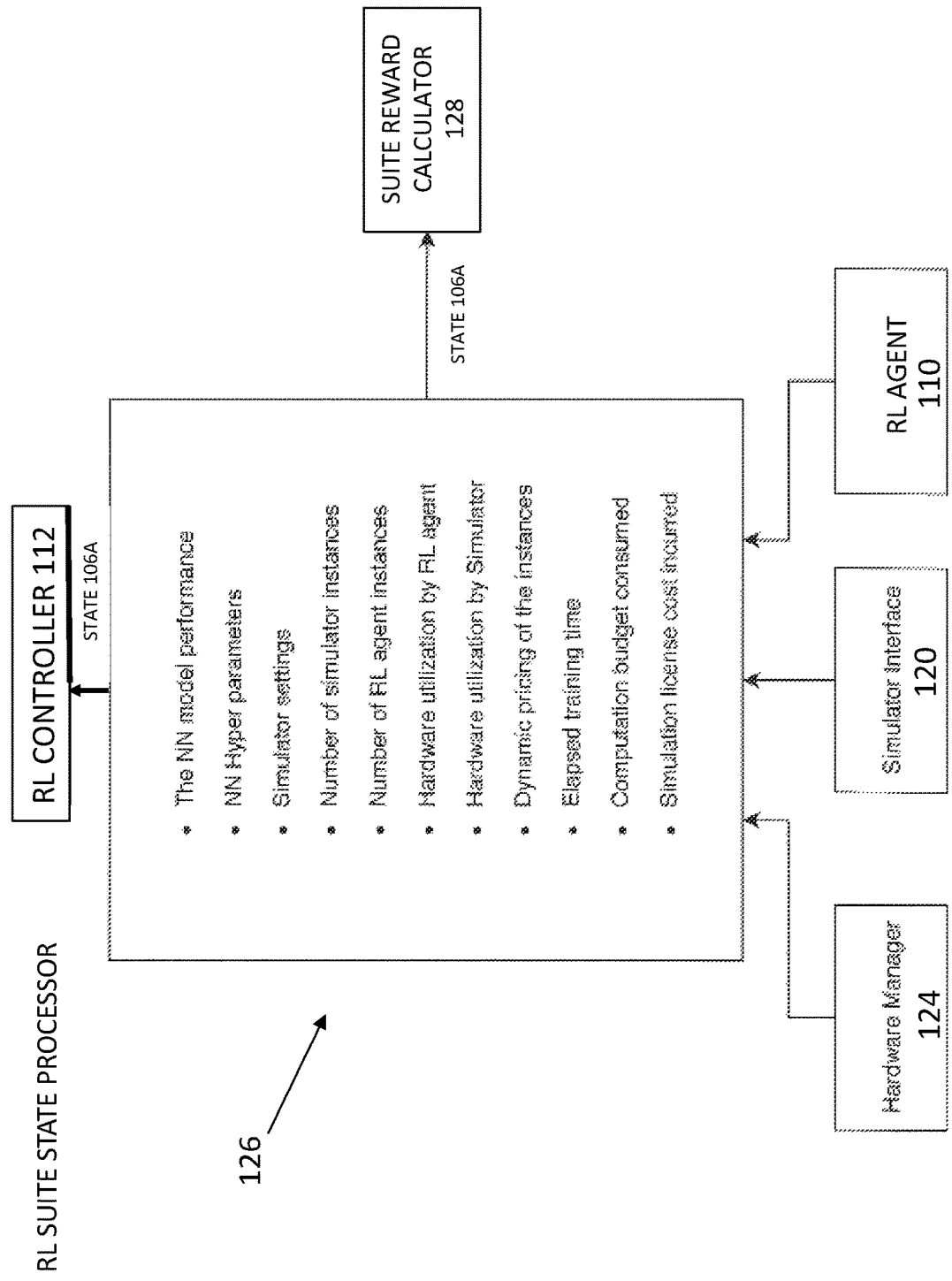
FIG. 7 is a block diagram illustrating the RL suite state processor of FIGS. 3, 4, and 5.

Referring now generally to the Figures and particularly to FIG. 7, FIG. 7 is a block diagram showing the RL state suite processor 126, this device's internal operations, and the communications sent to and received from other elements. The RL suite state processor receives information from the hardware manager 124, the simulator interface 120, and the RL agent 110, and includes the following factors in its calculations: the neural network model performance, the neural network hyper parameters, the simulator settings, the number of simulator instances, the number of RL agent instances, the hardware utilization by the RL agent, the hardware utilization by the simulator, the dynamic pricing of the instances, the elapsed training time, the computation budget consumed, and the simulation license cost incurred. The RL suite state processor 126 then communicates signals concerning the state of the outer loop to the RL controller 112 and the RL suite reward calculator 128.

Figure 8:
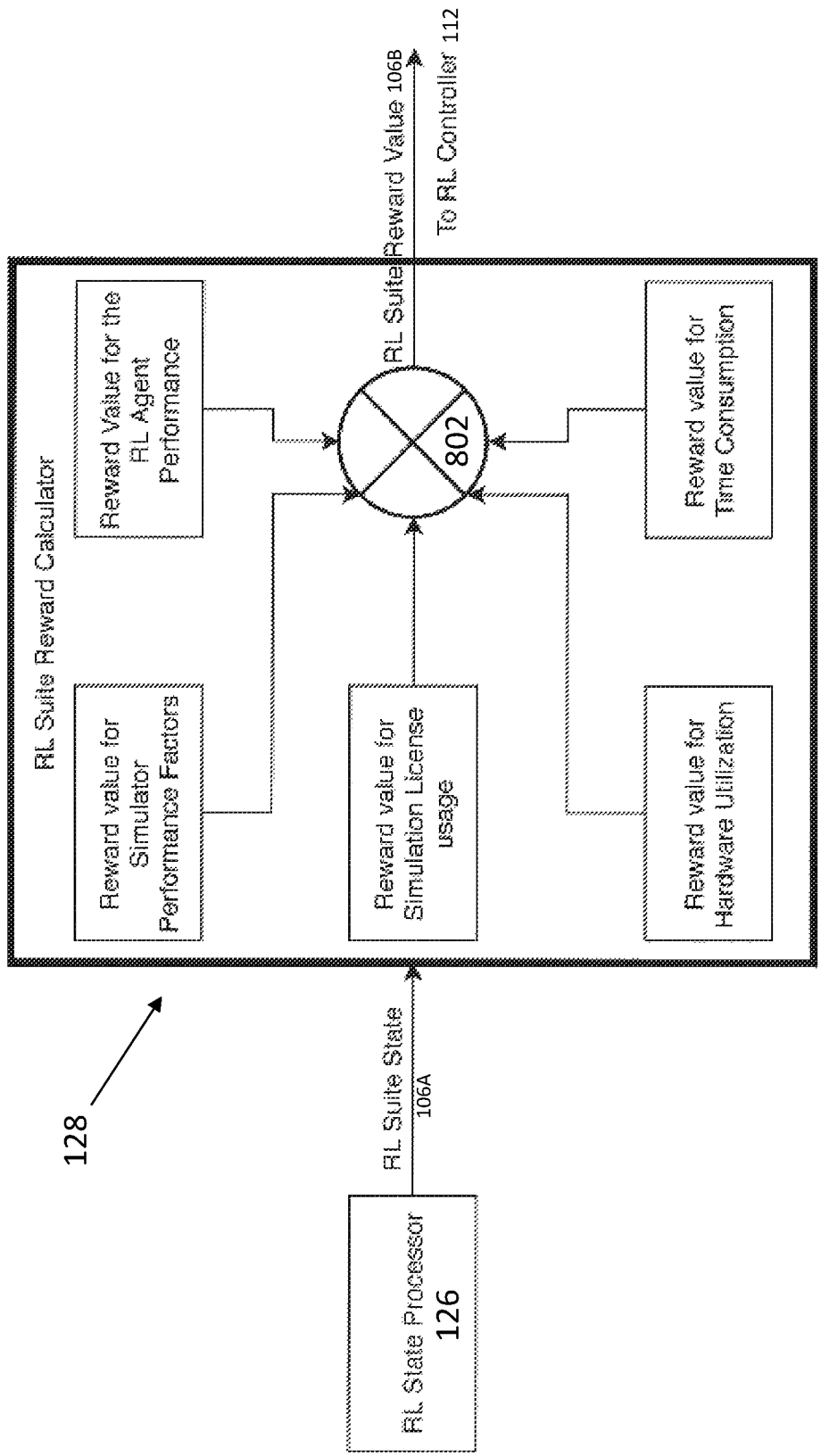
FIG. 8 is a block diagram illustrating the RL suite reward calculator or FIGS. 3, 4, and 5.

Referring now generally to the Figures and particularly to FIG. 8, FIG. 8 is a block diagram further detailing the internal function of the RL suite reward calculator 128. The RL suite reward calculator 128 receives as input one or more data signals from the RL suite state processor 126. As shown, the RL suite reward calculator 128 then calculates how productive the current round of machine learning was using an algorithm applied by a reward computer module 802 and incorporating several relevant factors including the following: reward value for simulator performance factors, reward value for the RL agent performance, reward value for simulation license usage, reward value for hardware utilization, and reward value for time consumption. The resulting reward score is sent as output to the RL controller 112.

Figure 9:
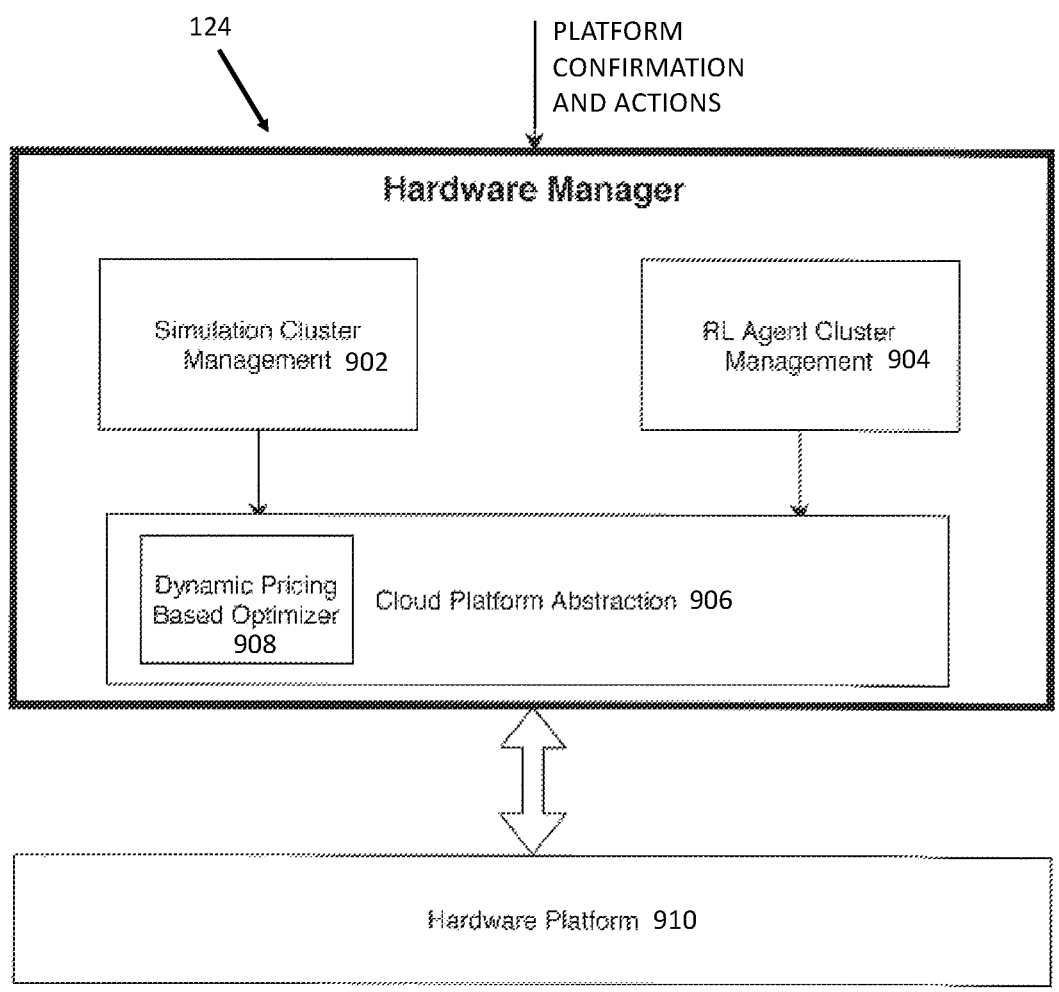
FIG. 9 is a block diagram illustrating the internal components of the hardware manager of FIGS. 3, 4, and 5.

Referring now generally to the Figures and particularly to FIG. 9, FIG. 9 is a block diagram showing more detail regarding the hardware manager 24 and the elements with which it interacts. Receiving external signals regarding the operating platform and the actions it is taking, a simulation cluster management unit 902 and an RL agent cluster management unit 904 each provide input to a cloud platform abstraction 906 that contains also a dynamic pricing-based optimizer 908. The hardware manager 124 is in two-way communication with a hardware platform 910.

Figure 10:
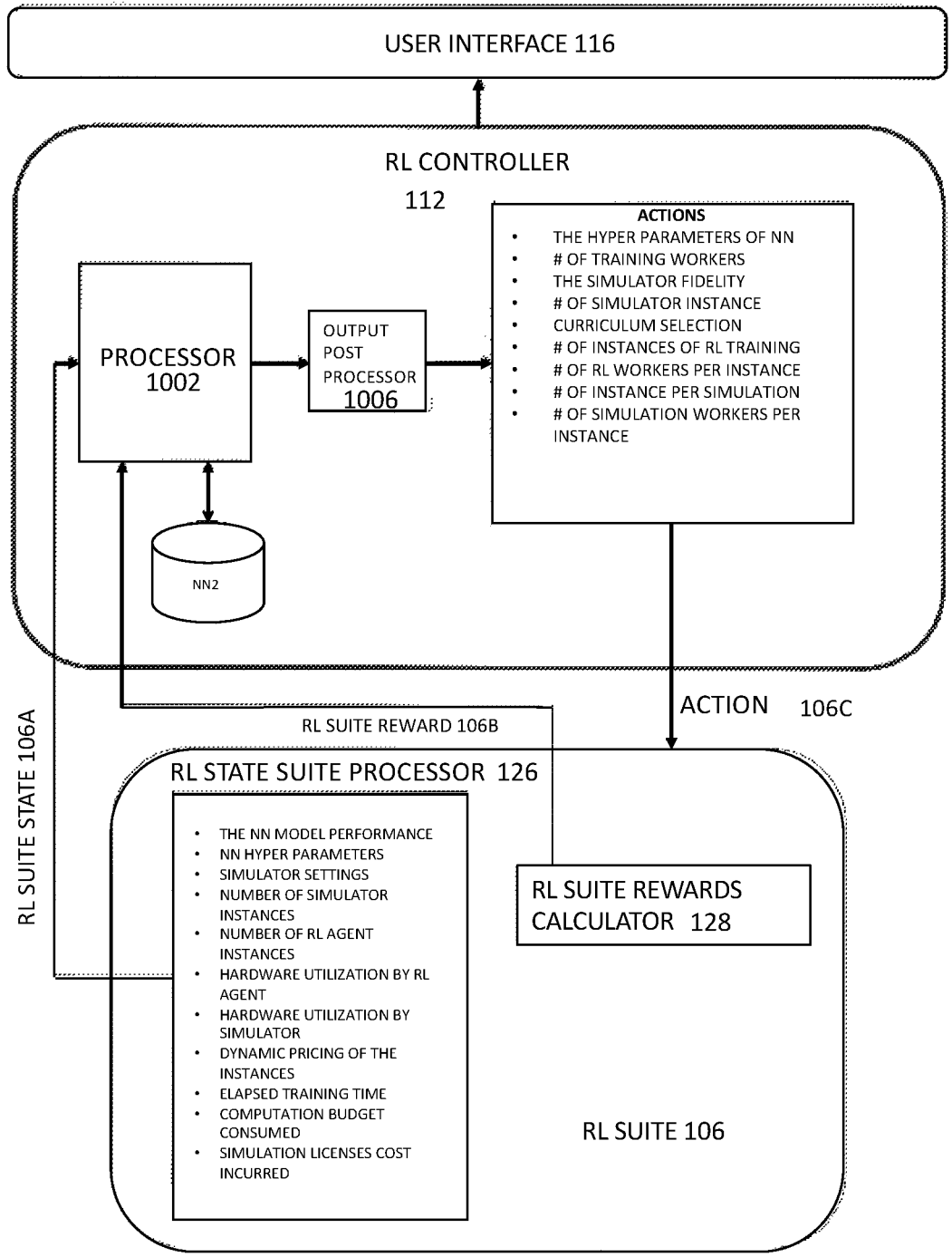
FIG. 10 is a block diagram showing the interaction between the user interface, RL controller, and RL suite of FIGS. 3, 4, and 5.

Referring now generally to the Figures and particularly to FIG. 10, FIG. 10 is a block diagram showing further detail regarding the interaction of the user interface 116, the RL controller 112, and the RL suite 106. The RL controller 112 contains a processor 1002, which is in two-way communication with the outer loop neural network NN2. It transmits output to an output post processor 1006, which processes the input and enables the RL controller 112 to select its action, managing considerations including: the hyper parameters of the outer loop neural network NN2, the number of training workers, the simulator fidelity, the number of this simulator instance, curriculum selection, the number of instances of RL training, the number of RL workers per instance, the number of instances per simulation, and the number of simulation workers per instance. Having selected an action, the RL controller communicates the action to the RL suite 106. The RL suite 106 includes the RL state suite processor and the RL suite reward calculator 128. The RL state suite processor operates based on factors including the following: the neural network model performance, neural network hyper parameters, simulator settings, number of simulator instances, number of RL agent instances, hardware utilization by the RL agent 110, hardware utilization by the simulator, dynamic pricing of the instances, elapsed training time, the computation budget consumed, and the simulation licenses cost incurred. The RL state suite processor 126 outputs a signal containing the outer loop state to the processor 1002 of the RL controller 126. The RL suite reward calculator 128 outputs a signal containing the outer loop reward value to the processor 1002 of the RL controller 112. The RL controller communicates also to the user interface 116.

Figure 11:
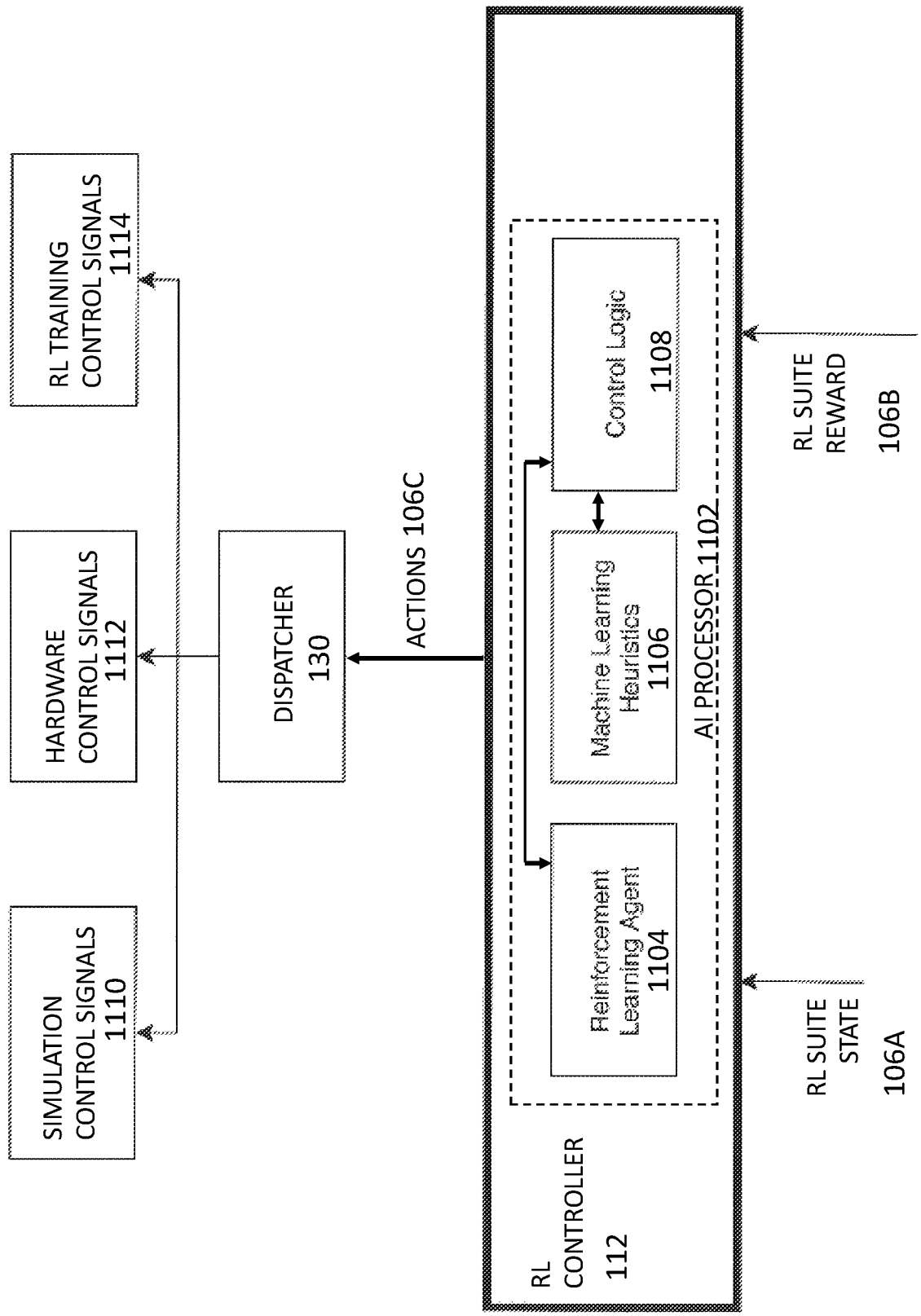
FIG. 11 is a block diagram presenting in greater detail certain aspects of the reinforcement learning training performed by the RL controller and dispatcher of FIGS. 3, 4, and 5.

Referring now generally to the Figures and particularly to FIG. 11, FIG. 11 is a block diagram that shows further detail regarding communication between the RL controller 112 and the suite action dispatcher 130. The RL controller 112 receives RL suite state signals and RL suite reward signals. The RL controller 112 includes an AI processor 1102 that incorporates reinforcement learning agent 1104 and machine learning heuristics 1106 into its control logic 1108. It transmits actions to the suite action dispatcher 130, which sends simulation control signals 1110, hardware control signals 1112, and RL training control signals 1114.

Figure 12:
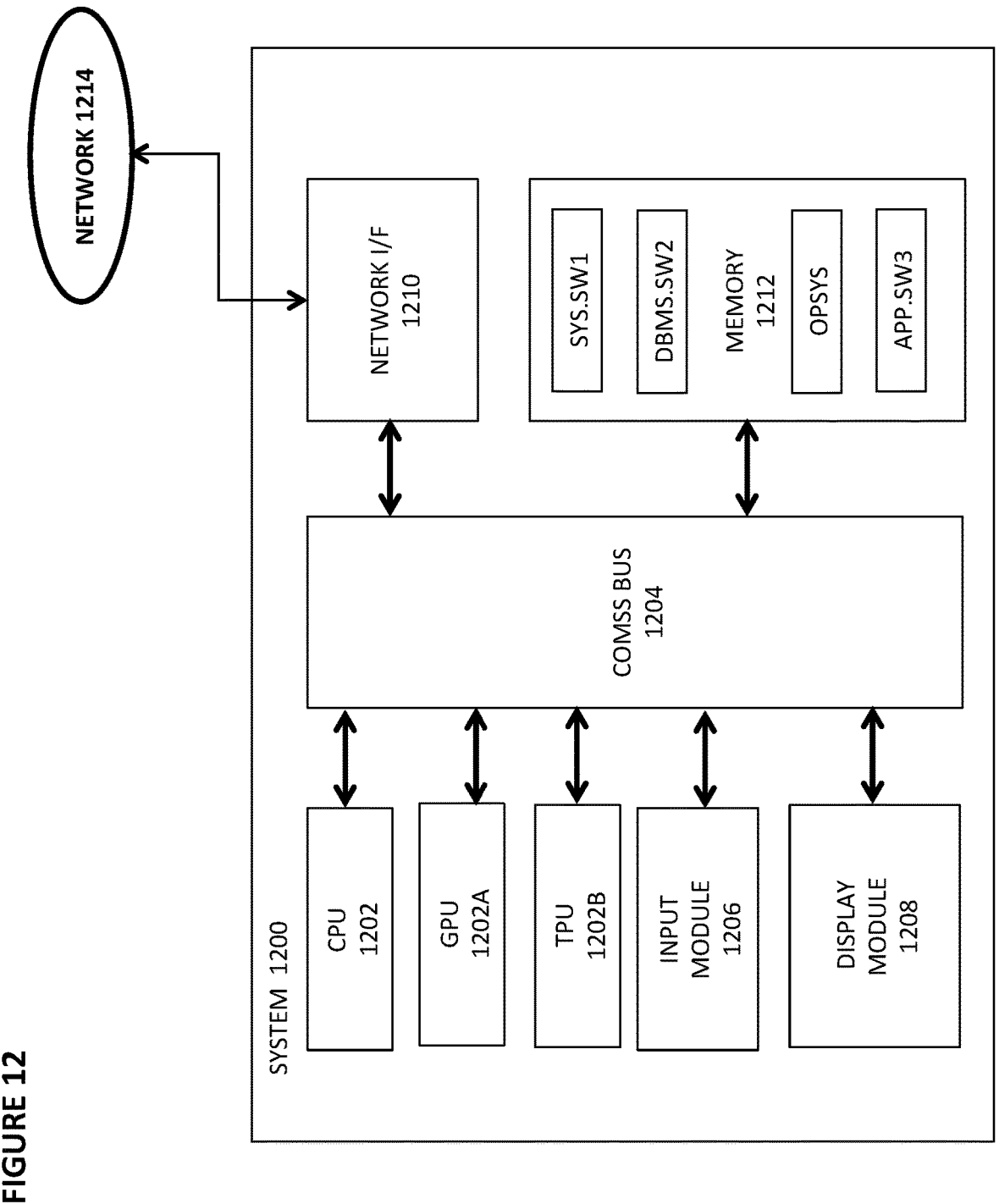
FIG. 12 is a schematic block diagram of an information technology system configured to execute the aspects of the invented method of FIGS. 1 through 11 and FIG. 15.

Referring now generally to the Figures and particularly to FIG. 12, FIG. 12 is a schematic block diagram of an information technology system 1200 configured to execute the aspects of the invented method of FIGS. 1 through 11 and FIG. 15. It is understood that the information technology system may be, comprise, or be comprised within, the first system 100.

The information technology system 1200 (hereinafter, "the second system" 1200) may include, but is not limited to, a personal computing system, mainframe computing system, workstation, image computer, parallel processor, or any other suitable device known in the art. In general, the term " information technology system" is broadly defined to encompass any device having one or more processors, which execute instructions from a memory medium.

It should be recognized that in some embodiments the various steps described throughout the present disclosure may be carried out by a single information technology system or multiple information technology systems.

The second system 1200 includes a central processing unit module 1202 (hereinafter, "CPU" 1202) that may comprise one or more logic processors. The CPU 1202 is bi-directionally communicatively coupled by an internal communications bus 1204 with an optional GPU 1202A, an optional TPU 1202B, a user input module 1206, a display module 1208, a network communications interface module 1210 and a system memory 1212. The user input module 1206 is adapted to enable the user 202 or other human operator to direct the second system 1200 in accordance with the invented method. The display module 1208 is adapted to enable the second system 1200 to visually display to the user 202 or other human operator data, status and instructions in accordance with the invented method, to include a system software SYS.SW1 and a database management system DBMS SW2, and other information stored in the memory 1212 and/or provided to the second system 1200 via the network interface 1210. The network interface 1210 bi-directionally communicatively couples the second system 1200 to an electronics communications network 1214.

The second system 1200 may be or comprise a bundled hardware and software informational technology system including but not limited to a uniprocessor system including one central processor unit 1202 (hereinafter, "processor" 1202), or a multiprocessor system including several processors 1202 (e.g., two, four, eight, or another suitable number). Processors 1202 may be any suitable processor capable of executing instructions. For example, in various embodiments processors 1202 may be general-purpose or embedded processors implementing any of a variety of instruction set architectures (ISAs), such as the x86, PowerPC, SPARC, or MIPS ISAs, or any other suitable ISA. In multiprocessor systems, each of processors 1202 may commonly, but not necessarily, implement the same ISA.

The processor 1202 may be or comprise one or more processors of (a.) the XEON™ and/or 9TH GENERATION CORE/COFFFEE LAKE™ family of microprocessor products and models marketed by INTEL Corporation of Santa Clara, Calif.; (b.) the RYZEN™ family of microprocessor products and models marketed by Advanced Micro Devices, Inc., of Sunnyvale, Calif.; and/or a POWER 9™ CPU as marketed by International Business Machines Corporation of Armonk, N.Y.

Still or additionally, one or more processors 1202 may be compatible with the ARM architecture as licensed by Arm Holdings plc. Of Cambridge, United Kingdom.

Alternatively or additionally, one or more processors 1202 may be or comprise a 1202A GPU that may be a graphics processing unit (hereinafter, "the GPU") as marketed by NVIDIA of Santa Clara, Calif.; a RADEON™ visual processing unit as marketed by Advanced Micro Devices, Inc., of Sunnyvale, Calif., or other suitable GPU known in the art.

Alternatively or additionally, one or more processors 1202 may be or comprise a tensor processing unit 1202B (hereinafter, "the TPU" 1202B) as manufactured by Google, Inc., of Menlo Park, Calif., or other suitable TPU known in the art, and/or other suitable artificial-intelligence accelerator application-specific integrated circuit (ASIC) known in the art.

Figure 13:
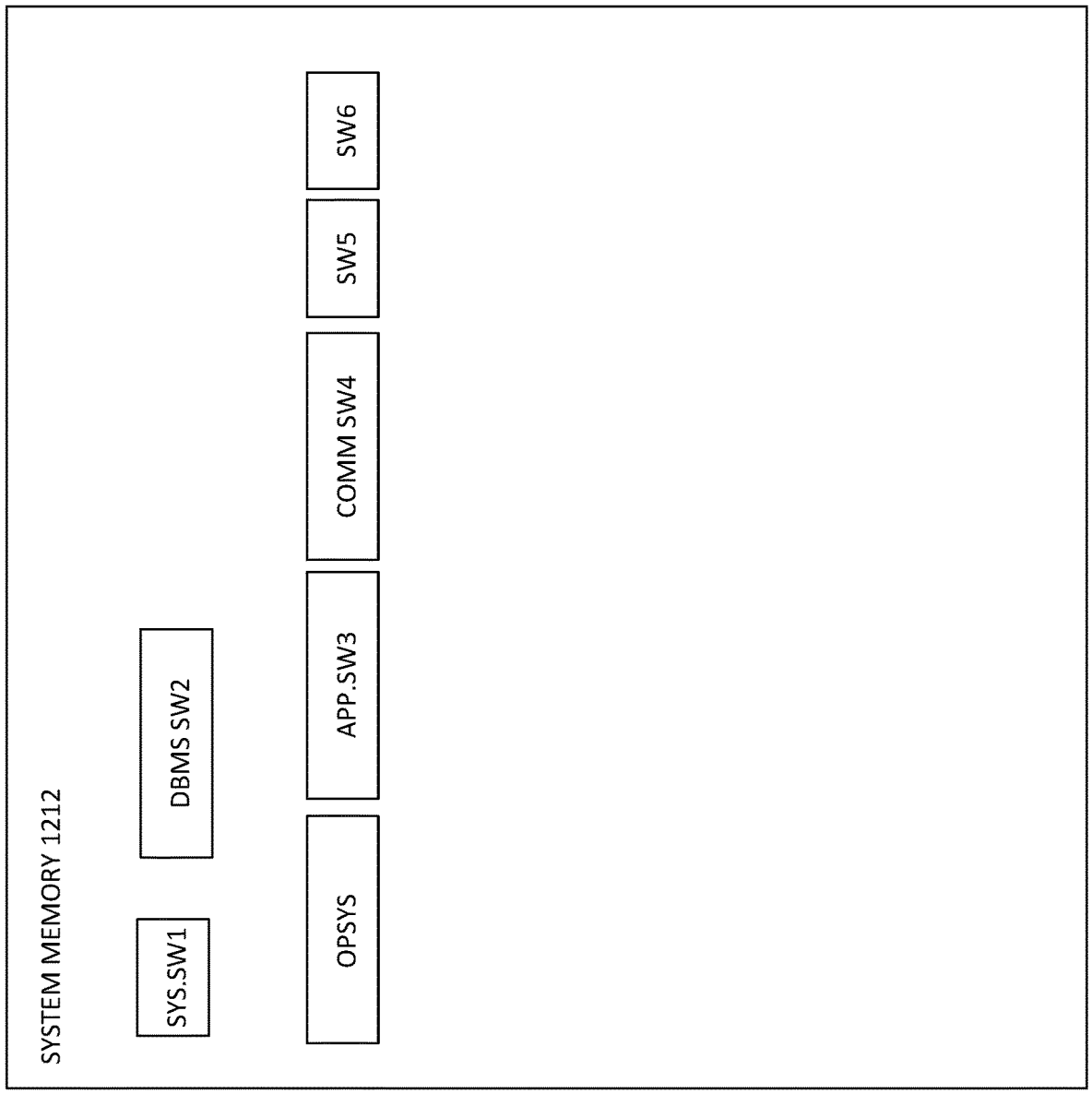
FIG. 13 is a block diagram of the system memory of the information technology system of FIG. 12.

Referring now generally to the Figures and particularly to FIG. 13 and FIG. 14, FIG. 13 is a block diagram of the system memory 1212 of the second system 1200 and FIG. 14 is a communications network diagram. The system software SYS.SW1 resident in the second system 1200 enables instantiation of the invented method of FIG. 1 through 11 and 15 in interaction with the user 202. The system memory 1212 additionally stores the database management system SW2, an operating system OPSYS, an applications software APP.SW3, a communications software SW4, an input module driver software SW5, and a display module driver software SW6. The applications software APP.SW3 enables and directs the second system 1200 to practice the aspects of the invented method as disclosed in the FIGS. 1 through 11 and FIG. 15 and accompanying text. The communications software SW4 enables the second system 1200 to bi-directionally communicate with hardware assets 1402-1416 as noted in FIG. 14, RL agents 110 & 110A-110N and/or domain-specific simulators 120 & 120A-120N.

The input module driver software SW5 enables the second system 1200 to operate the input module 1206 to allow the architect (not shown) and/or the user 202 to direct the second system 1200 in accordance with the invented method. The display module driver software SW6 enables the second system 1200 to operate the display module 1208 to visually display to the user 202 or other human operator data, status and instructions in accordance with the invented method.

Referring now generally to the Figures and particularly to FIG. 14, FIG. 14 is a block diagram of the electronics communications network 1214 by which certain alternate preferred embodiments of the invented method may be practiced. The electronics communications network 1214 (hereinafter, "network" 1214) that optionally comprises the Internet 1400, a plurality of remote information technology systems 1402A-1402N, and the second system 1200. It is understood that the network 1214 may further comprise additional electronic communications systems or networks. It is further understood that one or more remote information technology systems 1402A-1402N may be or comprise one or more low-level training hardware systems 302 or domain-specific computational systems 306.

One or more remote information technology systems 1402A-1402N may be or comprise a bundled hardware and software product such as desktop or cloud workstations, to include but not limited to, desktop computers, workstations, and/or one or more cloud workstation assets or elements of the Amazon Elastic Compute Cloud (EC2) as provided by Amazon.com, Inc. of Seattle, Wash.

Referring now generally to the figures and particularly to FIG. 12 through 15, FIG. 15 is a flowchart of an exemplary instantiation of the system software SYS.SW1 executing at least one invented method of an outer loop reinforcement learning process that preferably encompasses a plurality of inner loop reinforcement learning cycle executions.

In step 15.00 the second system 1200 boots up and powers up and in step 15.02 the second system 1200 accepts commands, information and values from the user 202 or an architect (not shown) via the RL user interface 116 information, to include but not limited to, (a.) financial budgeting values; (b.) financial expense limits; (c.) training values for use in applying an inner loop reinforcement learning cycle and/or an outer loop reinforcement learning cycle; (d.) time duration limitations for application to the processing of an inner loop reinforcement learning cycle and/or an outer loop reinforcement learning cycle; (e.) software license identifiers; (f.) hardware asset identifiers, and other suitable information known in the art for organizing and/or executing a reinforcement learning process. The financial budgeting values and limits received by the second system 1200 in step 15.02 may include (a.) values of costing and/or expense of hardware asset use; (b.) limitations of authorized hardware budget expense; (c.) values of costing and/or expense of software license expense; (d.) limitations of authorized software license expense; (e.) values of costing and/or expense of domain specific simulator software license expense; (f.) limitations of authorized domain specific simulator software license expense; (g.) limitations of total authorized reinforcement learning process cycle expense per each inner loop cycle.; and/or (h.) limitations of total authorized reinforcement learning process expense for an outer loop process. The software license identifiers and/or the hardware asset identifiers may be associated with network addresses of one or more of the plurality of remote information technology systems 1402A-1402N of the network 1214 at which computational resources and DS simulators 120 through which the software license identifiers and/or the hardware asset identifiers referenced or identified in step 15.02 may be accessed.

In step 15.04 the RL user interface 116 transfers the information and instructions received in step 15.02 that is necessary and sufficient to perform a series of inner loop reinforcement learning cycles, wherein the inner loop is instantiated by means of (a.) the RL suite 106, and (b.) the first model 104 and/or additional suitable software models known in the art.

In step 15.06 the RL suite 106 organizes to prepare and pre-stage the first model 102, the domain-specific simulator 120 and the RL agent 110 to perform a series of inner loop reinforcement learning cycles in accordance with the information and instructions received in step 15.02.

In step 15.08, an inner loop reinforcement training cycle is performed by the RL suite 106 in communication with the first model 102.

In step 15.10 the RL suite 106 transfers the RL suite state information 106A and the RL suite reward 106B to the RL controller 112 to update the outer loop neural network NN2 of the RL controller 112.

In step 15.12 the RL suite 106 determines to cease the current inner loop reinforcement learning session of step 15.08 on the basis of whether the most recently executed inner loop reinforcement learning cycle has either (1.) achieved one or more training goal values received in step 15.02; or (2.) met or exceeded (a.) a training time limitation value T, (b.) a limitation of DS simulator license fee costs per DS simulation step or steps, (c.) a clock time budget consumed per DS simulation step or a plurality of DS simulation steps, and/or (d.) a limitation of usage cost for the third party hardware platforms 1402A-102N.

When the first system 100 determines in step 15.12 to continue the current the inner loop reinforcement learning process, the second system 1200 proceeds on to execute step 15.14, wherein the neural network NN2 newly generates RL suite 106 settings modification information and the RL controller transfers the setting modification information generated to the RL suite 106 within an RL controller action 106C. The second system 1200 proceeds from step 15.14 to perform an additional execution of step 15.08.

When in step 15.12 the RL suite 106 determines to not continue the current inner loop reinforcement learning session, the RL suite 106 proceeds on to step 15.16 and to inform the RL controller 112 of this cessation of inner loop reinforcement learning of the RL suite 106, and additionally transfers the RL suite state information 106A and the RL suite reward 106B to the RL controller 112 to further update the outer loop neural network NN2 of the RL controller 112.

The second system 1200 proceeds from step 15.16 to step 1.26 and to perform alternate computational operations in step 15.18.

Figure 16:
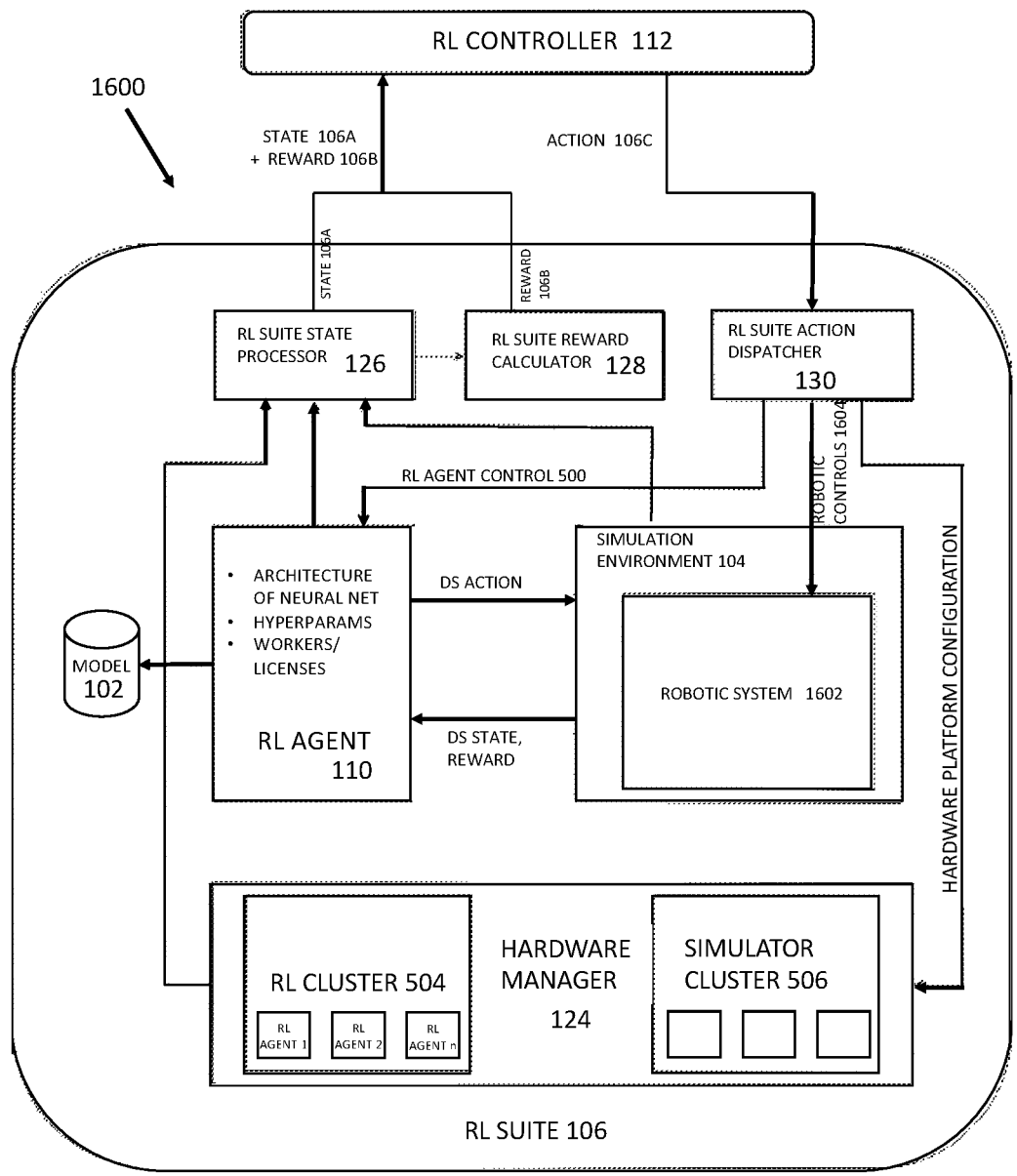
FIG. 16 is a detailed block diagram of the RL suite of software modules of FIG. 4 configured with a robotic control module in place of or in addition to the domain-specific simulator of FIG. 4.

Referring now generally to the Figures and particularly to FIG. 16, FIG. 16 is a diagram of an alternate preferred embodiment of the present invention 1600 (hereinafter, "the second system" 1600) comprising the RL controller 112 and the RL suite 106. The second system 1600 includes the RL framework 114 and some or all of the software elements, computational hardware assets, and additionally, optionally or alternatively, bundled software and computational hardware systems and products of the first system 100. More particularly, the RL framework includes the RL user interface 116, the RL orchestrator 118, the RL controller 112, and the RL suite 106. The RL suite 106, however, includes a robotic system 1602 in place or in addition to the DS simulator 120. Robotic signal controls of the second system 1600 are delivered to the robotic system 1602 by the RL suite action dispatcher 130. Informational, signal and/or sensor outputs are optionally generated by the robotic system 1602 and provided to the simulation environment 104. The RL suite action dispatcher 130 separates the contents of each RL controller actions 106C into an RL agent control information 500 and a robotic controls information 1604. Each RL agent control information 500 is transferred to the RL agent 110, and each robotic controls information 1604 is transferred to the simulation environment 104.

Figure 17:
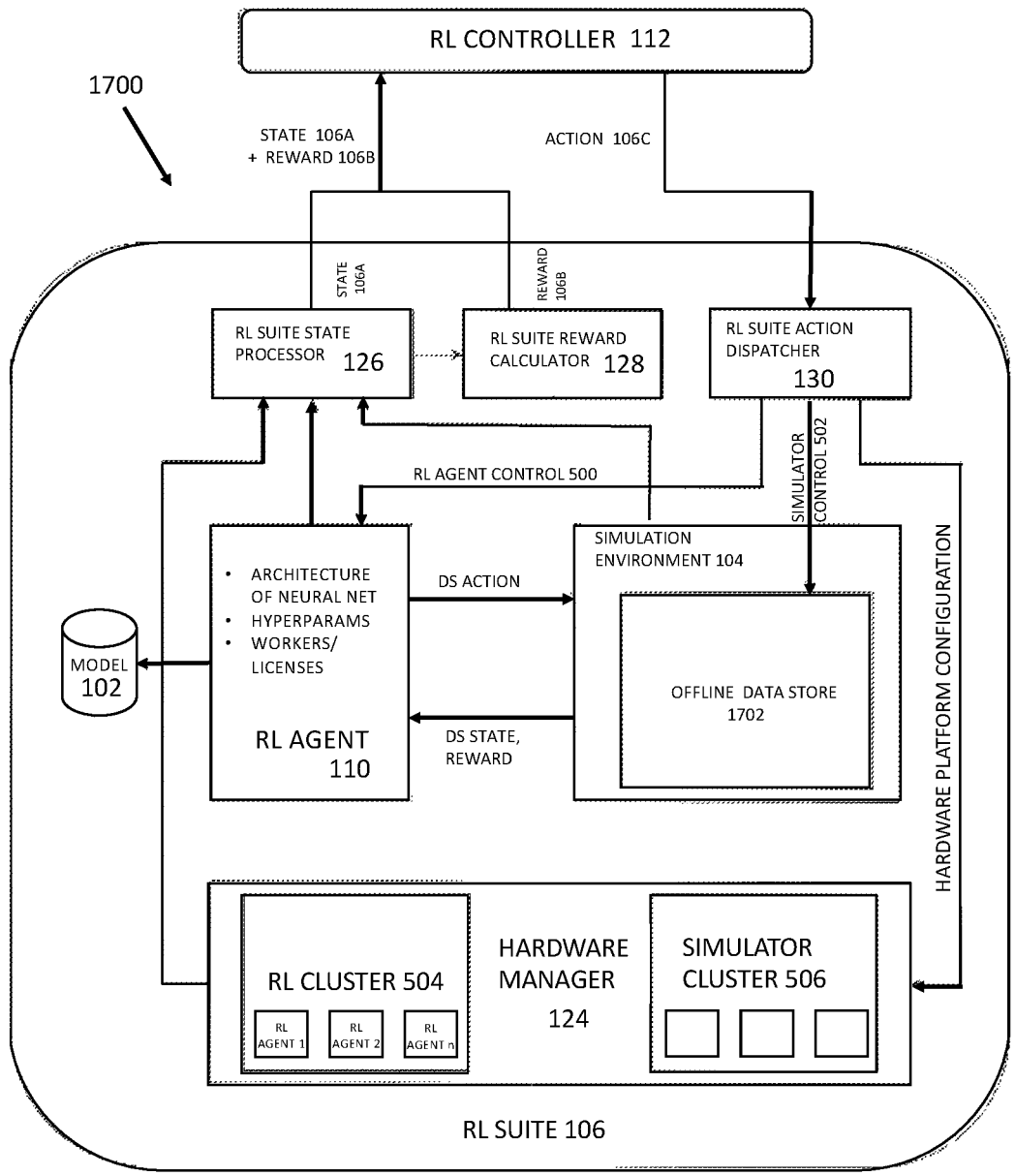
FIG. 17 is a detailed block diagram of the RL suite of software modules of FIG. 4 configured with a data store in place of or in addition to the domain-specific simulator of FIG. 4.

Referring now generally to the Figures and particularly to FIG. 17, FIG. 17 is a diagram of an alternate preferred embodiment of the present invention 1700 (hereinafter, "the third system" 1700) comprising the RL controller 112 and the RL suite 106. The third system 1700 includes the RL framework 114 and some or all of the software elements, computational hardware assets, and additionally, optionally or alternatively, bundled software and computational hardware systems and products of the first system 100. More particularly, the RL framework includes the RL user interface 116, the RL orchestrator 118, the RL controller 112, and the RL suite 106. The RL suite 106 of the third system 1700, however, includes a data store in place or in addition to the DS simulator 120. Data store input controls and data are delivered to the data store 1702 by the RL suite action dispatcher 130. Informational, simulated signal and/or simulated sensor outputs are optionally generated by the data store 1702 and provided to the simulation environment 104.

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

We claim:

1. A computer implemented nesting reinforcement machine learning method applied to improve a cost effectiveness of a nested software-encoded reinforcement learning program, the method comprising:

(a.) a nesting reinforcement machine learning software-encoded program performing a plurality of cycles of execution ("executions") of the nested software-encoded reinforcement learning program;

(b.) the nesting reinforcement machine learning software-encoded program evaluating variations of at least one financial cost value monitored during the executions of the nested software-encoded reinforcement learning program; and (c.) the nesting reinforcement machine learning software-encoded program adjusting at least one resource parameter value of the nested software-encoded reinforcement learning program at least partly in consideration of the variations of the at least one financial cost value observed during the executions of the nested software-encoded reinforcement learning program.

2. The method of claim 1, wherein the at least one financial cost value is derived from a license fee.

3. The method of claim 2, wherein the license fee is incurred in the use of a software program.

4. The method of claim 3, wherein the software program is a simulation program.

5. The method of claim 4, wherein the software program is at least partially executed on a prespecified type of computational system.

6. The method of claim 4, wherein the nested software-encoded reinforcement learning program bi-directionally communicates with a software-encoded model in performing at least one cycle of execution of the nested software-encoded reinforcement learning program.

7. The method of claim 1, wherein the nested software-encoded reinforcement learning program bi-directionally communicates with a software-encoded model in performing at least one cycle of execution of the nested software-encoded reinforcement learning program.

8. The method of claim 1, wherein the at least one financial cost value is related to a usage fee of a bundled software and computational hardware system.

9. The method of claim 1, wherein the nesting reinforcement machine learning software-encoded program adapts to one or more granularity settings available in a domain-specific simulator.

10. The method of claim 1, wherein the nesting reinforcement machine learning software-encoded program adapts to the licensing model associated with the granularity settings of the simulator.

11. The method of claim 1, wherein the nesting reinforcement machine learning software-encoded program includes a time limitation of duration of the plurality of cycles of execution of the software-encoded reinforcement learning program.

12. The method of claim 1, wherein the at least one resource parameter value limits a financial expenditure.

13. The method of claim 1, wherein the at least one resource parameter value limits a total count of licenses to be accessed in a performance of a succeeding plurality of cycles of execution of the nested software-encoded reinforcement learning program.

14. The method of claim 13 wherein the limitation of the total count of licenses to be accessed in a performance of a succeeding plurality of cycles of execution of the nested software-encoded reinforcement learning program includes at least one software program license.

15. The method of claim 13, wherein the limitation of the total count of licenses to be accessed in a performance of a succeeding plurality of cycles of execution of the nested software-encoded reinforcement learning program includes at least one software license.

16. The method of claim 15, wherein the software license permits access to a simulation program.

17. The method of claim 16, wherein the simulation program is at least partially executed on a computational system accessed via an electronic communications network.

18. The method of claim 13, wherein the limitation of the total count of licenses to be accessed in a performance a succeeding plurality of cycles of execution of the nested software-encoded reinforcement learning program includes at least one computational system license.

19. A computing system, comprising:
one or more processors; and
a memory coupled to the one or more processors and configured to implement a shared storage system, wherein the memory is further configured to store program instructions executable by the one or more processors to implement:
(a.) a nesting software-encoded reinforcement machine learning program performing a plurality of cycles of execution of a nested software-encoded reinforcement learning program, whereby the nested software-encoded reinforcement learning program is nested within the software-encoded reinforcement machine learning program;
(b.) evaluating at least one financial cost value related to the execution of the nested software-encoded reinforcement learning program; and
(c.) adjusting at least one resource parameter value of the nested software-encoded reinforcement learning program at least partly in consideration of variations of the at least one financial cost value as monitored by the nesting software-encoded reinforcement machine learning program during the plurality of cycles of execution of the nested software-encoded reinforcement learning program.

20. The system of claim 19, wherein the at least one financial cost value is derived from a license fee.

21. The system of claim 20, wherein the license fee is incurred in the use of a software program.

22. The system of claim 21, wherein the software program is a simulation program.

* * * * *